(12) United States Patent
Papasakellariou

(10) Patent No.: US 10,547,426 B2
(45) Date of Patent: Jan. 28, 2020

(54) TRANSMISSION OF SOUNDING REFERENCE SIGNALS IN COMMUNICATION SYSTEMS WITH CARRIER AGGREGATION

(71) Applicant: Samsung Electronics Co., Ltd, Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 15/445,951

(22) Filed: Feb. 28, 2017

(65) Prior Publication Data

US 2017/0264402 A1 Sep. 14, 2017

Related U.S. Application Data

(60) Provisional application No. 62/417,616, filed on Nov. 4, 2016, provisional application No. 62/345,949, filed
(Continued)

(51) Int. Cl.
*H04J 11/00* (2006.01)
*H04L 5/00* (2006.01)
(Continued)

(52) U.S. Cl.
CPC .............. *H04L 5/005* (2013.01); *H04B 7/04* (2013.01); *H04L 5/0051* (2013.01); *H04L 5/0053* (2013.01); *H04W 52/06* (2013.01); *H04W 52/242* (2013.01); *H04W 52/36* (2013.01); *H04W 52/40* (2013.01); *H04W 52/58* (2013.01); *H04W 74/006* (2013.01); *H04L 5/001* (2013.01); *H04L 5/0055* (2013.01);
(Continued)

(58) Field of Classification Search
CPC ......... H04L 5/005; H04L 5/0055; H04B 7/04; H04W 52/06; H04W 74/006
See application file for complete search history.

(56) References Cited

U.S. PATENT DOCUMENTS 9,419,766 B2 * 8/2016 Takeda ................... H04L 5/0053
10,097,335 B2 * 10/2018 Lee .......................... H04L 5/001
(Continued)

FOREIGN PATENT DOCUMENTS

| WO | 2012/044846 A1 | 4/2012 |
| WO | 2014062029 A1 | 4/2014 |
| WO | 2014182116 A1 | 11/2014 |

OTHER PUBLICATIONS

ISA/KR, "International Search Report," Application No. PCT/KR2017/002730, dated Jun. 22, 2017, 3 pages, Korean Intellectual Property Office, Daejeon, Korea.
(Continued)

*Primary Examiner* — Stephen M D Agosta

(57) ABSTRACT

Methods and apparatus are provided for a base station to trigger transmissions of sounding reference signals (SRS) from one or multiple user equipments (UEs) on one or multiple cells and for a UE to determine a power, a time instance, and other parameters for SRS transmissions in response to the triggering. A SRS transmission can be on a cell where a UE is not configured to transmit data or control information.

20 Claims, 14 Drawing Sheets

Related U.S. Application Data on Jun. 6, 2016, provisional application No. 62/307,625, filed on Mar. 14, 2016.

(51) Int. Cl.

| | | |
|---|---|---|
| *H04W 52/36* | (2009.01) | |
| *H04W 52/58* | (2009.01) | |
| *H04W 52/24* | (2009.01) | |
| *H04W 52/40* | (2009.01) | |
| *H04B 7/04* | (2017.01) | |
| *H04W 52/06* | (2009.01) | |
| *H04W 74/00* | (2009.01) | |
| *H04W 52/32* | (2009.01) | |

(52) U.S. Cl.
CPC ........ *H04W 52/325* (2013.01); *H04W 52/362* (2013.01); *H04W 52/365* (2013.01)

(56) References Cited

U.S. PATENT DOCUMENTS

| | | | |
|---|---|---|---|
| 2011/0216842 A1 | 9/2011 | Zhang et al. | |
| 2011/0310818 A1* | 12/2011 | Lin | H04L 5/0048 370/329 |
| 2012/0044906 A1* | 2/2012 | Chen | H04L 5/001 370/329 |
| 2013/0034064 A1 | 2/2013 | Nam et al. | |
| 2013/0058306 A1* | 3/2013 | Noh | H04L 1/1671 370/329 |
| 2013/0156014 A1* | 6/2013 | Kim | H04L 5/0051 370/336 |
| 2013/0286994 A1* | 10/2013 | Liu | H04L 5/0048 370/329 |
| 2013/0294400 A1* | 11/2013 | Liu | H04L 5/001 370/330 |
| 2014/0071902 A1 | 3/2014 | Sorrentino et al. | |
| 2014/0071903 A1* | 3/2014 | Sorrentino | H04W 52/325 370/329 |
| 2014/0105110 A1* | 4/2014 | Hoshino | H04W 52/18 370/328 |
| 2014/0185540 A1* | 7/2014 | Gaal | H04L 1/1867 370/329 |
| 2014/0286305 A1* | 9/2014 | Yamada | H04W 36/165 370/331 |
| 2014/0321406 A1* | 10/2014 | Marinier | H04B 7/024 370/329 |
| 2015/0223213 A1 | 8/2015 | Moon et al. | |
| 2015/0237520 A1 | 8/2015 | Jongren et al. | |
| 2016/0080121 A1 | 3/2016 | Kim et al. | |
| 2016/0337157 A1 | 11/2016 | Papasakellariou | |
| 2017/0019915 A1* | 1/2017 | Nogami | H04L 69/22 |

OTHER PUBLICATIONS

ISA/KR, "Written Opinion of the International Searching Authority," Application No. PCT/KR2017/002730, dated Jun. 22, 2017, 9 pages, Korean Intellectual Property Office, Daejeon, Korea.

3GPP TS 36.213 v. 13.0.1, "3rd Generation Partnership Project; Technical Specification Group Radio Access Network; Evolved Universal Terrestrial Radio Access (E-UTRA); Physical layer procedures (Release 13)," Jan. 27, 2016, 226 pages.

Samsung, "SRS Triggering and DCI Format 3/3a size," R1-160545, 3GPP TSG RAN WGI #84, St. Julians, Malta, Feb. 5, 2016, 4 pages.

"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.

Foreign Communication from Related Counterpart Application, PCT Application PCT/KR2017/001981, International Search Report dated May 23, 2017, 3 pages.

Foreign Communication from Related Counterpart Application, PCT Application PCT/KR2017/001981, Written Opinion of the International Searching Authority dated May 23, 2017, 6 pages.

ETSI TS 136 211 V13.0.0 (Jan. 2016) LTE; Evolved Universal Terrestrial Radio Access (E-UTRA); Physical channels and modulation (3GPP TS 36.211 version 13.0.0 Release 13)—Jan. 1, 2016—143 Pages.

ETSI TS 136 212 V13.0.0 (Jan. 2016) LTE; Evolved Universal Terrestrial Radio Access (E-UTRA); Multiplexing and channel coding (3GPP TS 36.212 version 13.0.0 Release 13)—Jan. 2016—125 Pages.

ETSI TS 136 213 V13.0.0 (May 2016)LTE; Evolved Universal Terrestrial Radio Access (E-UTRA); Physical layer prodecures (3GPP TS 36.213 version 13.0.0 Release 13)—May 2016—328 Pages.

ETSI TS 136 321 V13.0.0 (Feb. 2016) LTE; Evolved Universal Terrestrial Radio Access (E-UTRA); Medium Access Control (MAC) protocol specification (3GPP TS 36.321 version 13.0.0 Release 13)—Feb. 2016—84 Pages.

ETSI TS 136 331 V13.0.0 (Jan. 2016) LTE; Evolved Universal Terrestrial Radio Access (E-UTRA); Radio Resource Control (RRC); Protocol specification (3GPP TS 36.331 version 13.0.0 Release 13)—Jan. 2016—670 Pages.

Supplementary European Search Report dated Feb. 14, 2019 in connection with European Patent Application No. 17 76 6953, 8 pages.

\* cited by examiner

TRANSMISSION OF SOUNDING REFERENCE SIGNALS IN COMMUNICATION SYSTEMS WITH CARRIER AGGREGATION

CROSS-REFERENCE TO RELATED APPLICATIONS AND CLAIM OF PRIORITY

This application claims priority under 35 U.S.C. § 119(e) to: U.S. Provisional Patent Application No. 62/307,625 filed on Mar. 14, 2016; U.S. Provisional Patent Application No. 62/345,949 filed on Jun. 6, 2016; and U.S. Provisional Patent Application No. 62/417,616 filed on Nov. 4, 2016. The above-identified provisional patent applications are hereby incorporated by reference in their entirety.

TECHNICAL FIELD

The present invention relates generally to wireless communication systems and, more specifically, to transmissions of sounding reference signals from a user equipment (UE) configured for operation with carrier aggregation (CA) in a communication system using time division duplexing (TDD). The present disclosure enables sounding reference signal (SRS) transmissions from a UE in cells where the UE in not configured for other uplink (UL) transmissions.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

Various embodiments of the present disclosure provide methods and apparatuses for CSI reporting.

In one embodiment, a user equipment (UE) is provided. The UE includes a receiver and a transmitter. The receiver is configured to receive a downlink control information (DCI) format that includes a first number of blocks of bits, and a second number of blocks of bits at respective second number from the first number of blocks of bits. A block of bits includes only a positive number of bits for a transmit power control (TPC) command and a number of bits for a sounding reference signal (SRS) request. The transmitter is configured to transmit a SRS with a power adjusted based on a value of the TPC command in a first block of bits from the second number of blocks of bits. When the number of bits for the SRS request in the first block of bits is positive, the SRS transmission is in response to a value of the SRS request. When the number of bits for the SRS request in the first block of bits is zero, the SRS transmission is in response to a configuration by higher layers.

In another embodiment, a UE is provided. The UE includes a receiver and a transmitter. The receiver is configured to receive a DCI format that schedules a reception of a data transport block (TB) and triggers a transmission of a SRS. The transmitter is configured to transmit the SRS and acknowledgement information in response to the data TB reception. When the SRS transmission is to overlap in time with the acknowledgement information transmission, the UE is configured to postpone transmission of the SRS.

In yet another embodiment, a base station (BS) is provided. The BS includes a transmitter and a receiver. The transmitter is configured to transmit a DCI format including a number of blocks of bits. A block of bits includes only a positive number of bits for a TPC command and a number of bits for a SRS request. The receiver is configured to receive a SRS with a power adjusted based on a value of the TPC command in a first block of bits. When the number of bits for the SRS request in the first block of bits is positive, the SRS reception in response to a value of the SRS request. When the number of bits for the SRS request in the first block of bits is zero, the SRS reception is in response to a configuration by higher layers.

In yet another embodiment, a BS is provided. The BS includes a transmitter and a receiver. The transmitter is configured to transmit a DCI format that schedules a transmission of a data TB and triggers a transmission of a SRS. The receiver is configured to receive the SRS and acknowledgement information for the data TB. When the SRS reception is to overlap in time with the acknowledgement information reception, the base station is configured to postpone reception of the SRS.

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated by reference into the present disclosure as if fully set forth herein:

3rd generation partnership project (3GPP) TS 36.211 v13.1.0, "E-UTRA, Physical channels and modulation" ("REF 1"); 3GPP TS 36.212 v13.1.0, "E-UTRA, Multiplexing and Channel coding" ("REF 2"), 3GPP TS 36.213 v13.1.0, "E-UTRA, Physical Layer Procedures" ("REF 3"); 3GPP TS 36.321 v13.1.0, "E-UTRA, Medium Access Control (MAC) protocol specification" ("REF 4"); 3GPP TS 36.331 v13.1.0, "E-UTRA, Radio Resource Control (RRC) Protocol Specification" ("REF 5"); and U.S. patent application Ser. No. 15/152,461, "Control Channel Transmission and Frequency Error Correction." ("REF 6")

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1:
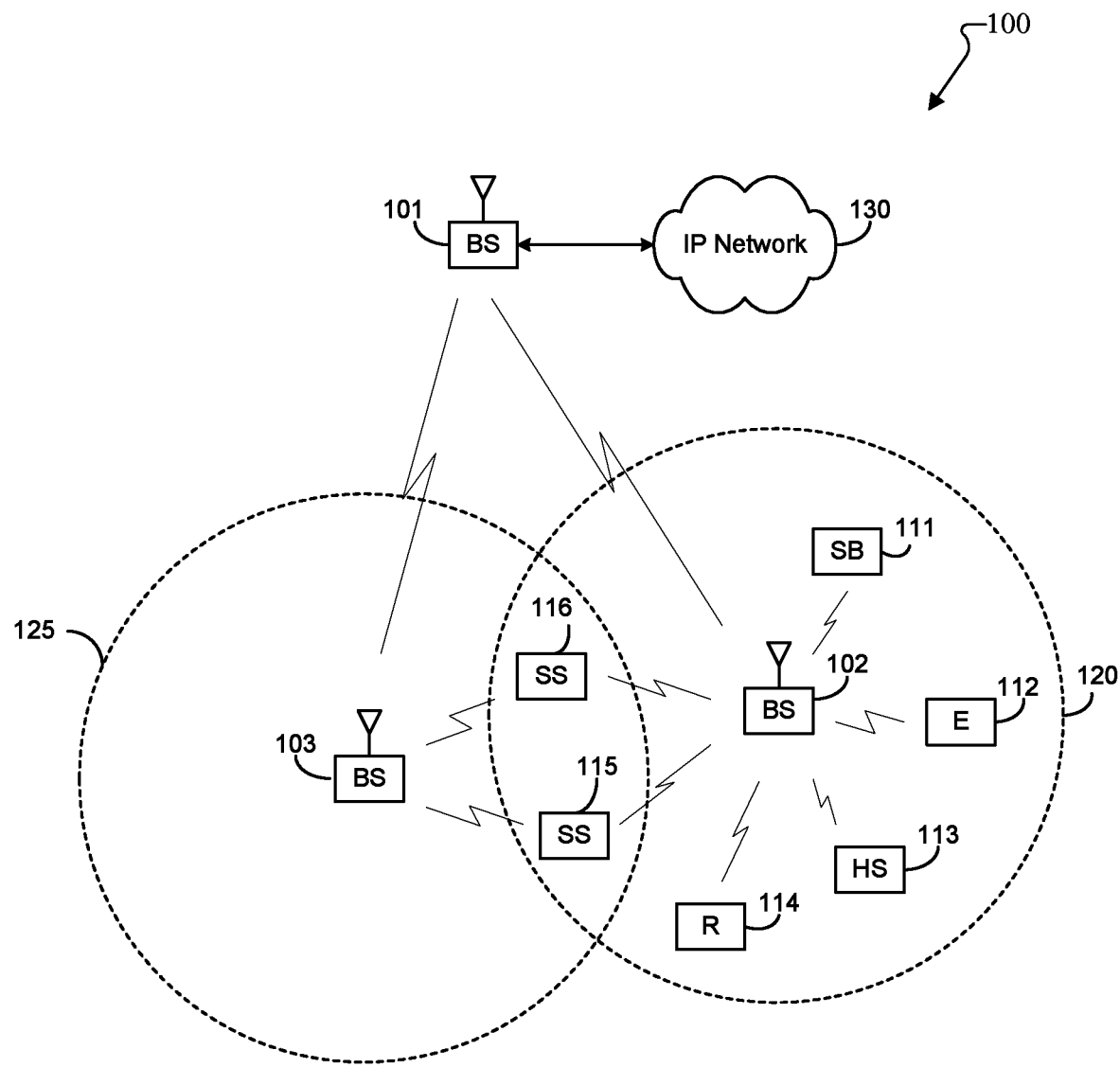
FIG. 1 illustrates an example wireless network according to some embodiments of the present disclosure.

FIG. 1 illustrates an example wireless network 100 according to some embodiments of the present disclosure. The embodiment of the wireless network 100 shown in FIG.

1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the transmission of sounding reference signals in Time Division Duplex (TDD) systems with carrier aggregation.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
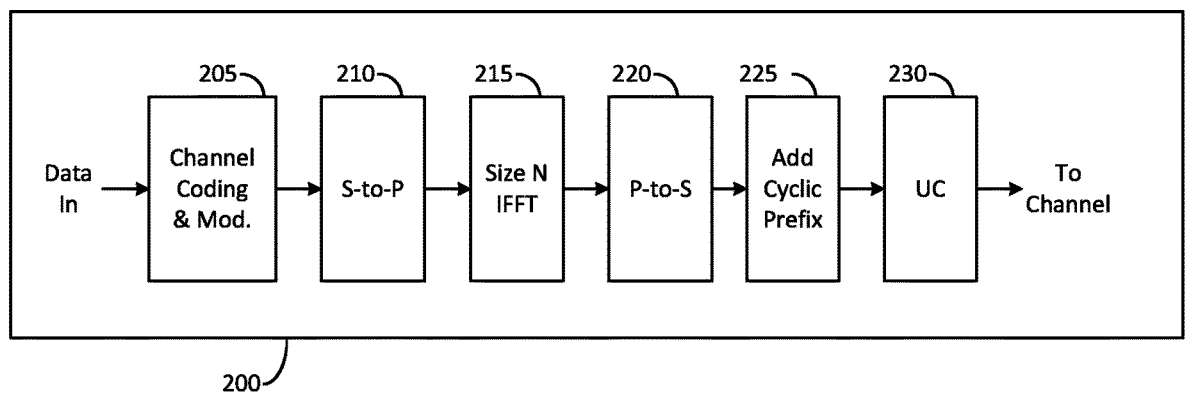
FIGS. 2A and 2B illustrate example wireless transmit and receive paths according to some embodiments of the present disclosure.
Figure 2B:
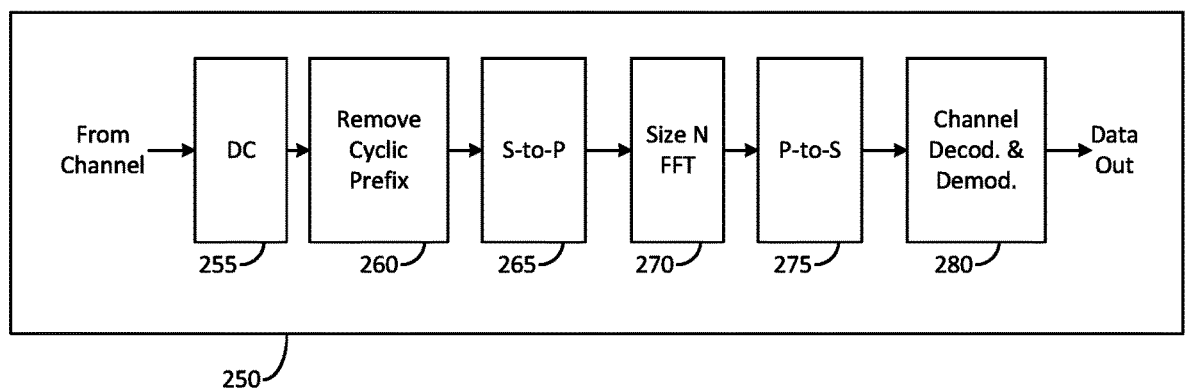

FIGS. 2A and 2B illustrate example wireless transmit and receive paths according to some embodiments of the present disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the transmission of sounding reference signals with carrier aggregation as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116.

Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
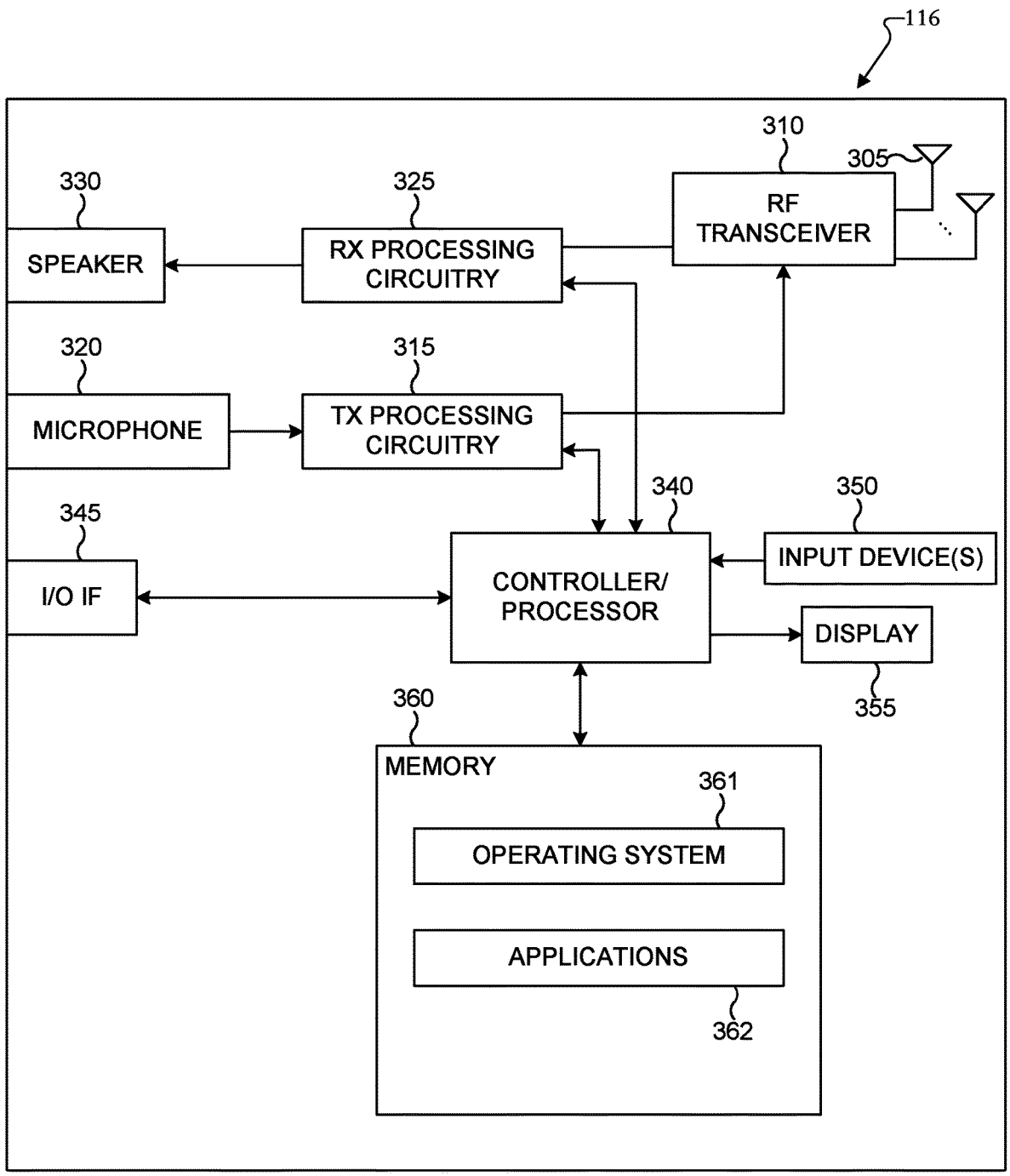
FIG. 3A illustrates an example user equipment according to some embodiments of the present disclosure.

FIG. 3A illustrates an example UE 116 according to some embodiments of the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
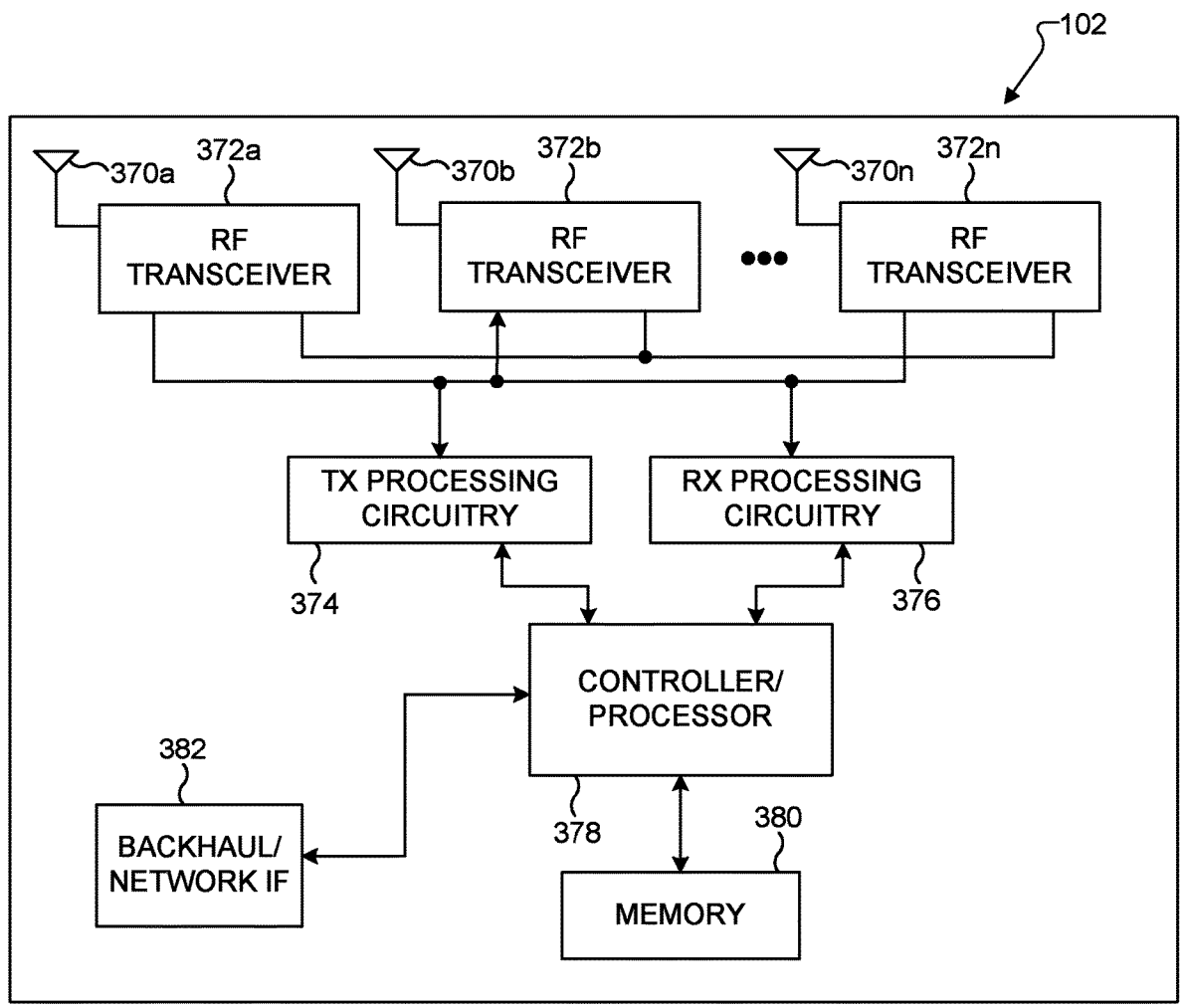
FIG. 3B illustrates an example enhanced NodeB (eNB) according to some embodiments of the present disclosure.

FIG. 3B illustrates an example eNB 102 according to some embodiments of the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting the transmission of sounding reference signals with carrier aggregation as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

A communication system includes a downlink (DL) that conveys signals from transmission points such as base stations or eNBs to UEs and an uplink (UL) that conveys signals from UEs to reception points such as eNBs. A UE, also commonly referred to as a terminal or a mobile station, may be fixed or mobile and may be a cellular phone, a personal computer device, or an automated device. An eNB, which is generally a fixed station, may also be referred to as an access point or other equivalent terminology.

DL signals include data signals conveying information content, control signals conveying DL control information (DCI), and reference signals (RS) that are also known as pilot signals. An eNB transmits data information or DCI through respective physical DL shared channels (PDSCHs) or physical DL control channels (PDCCHs). The PDCCH can be an enhanced PDCCH (EPDDCH) but the term PDCCH will be used for brevity to denote PDCCH or EPDCCH. A PDCCH is transmitted over one or more control channel elements (CCEs). An eNB transmits one or more of multiple types of RS including a UE-common RS (CRS), a channel state information RS (CSI-RS), and a demodulation RS (DMRS). A CRS is transmitted over a DL system bandwidth (BW) and can be used by UEs to demodulate data or control signals or to perform measurements. To reduce CRS overhead, an eNB can transmit a CSI-RS with a smaller density in the time and/or frequency domain than a CRS. For channel measurement, non-zero power CSI-RS (NZP CSI-RS) resources can be used. For interference measurement reports (IMRs), CSI interference measurement (CSI-IM) resources associated with zero power CSI-RS (ZP CSI-RS) resources can be used [3]. A CSI process consists of NZP CSI-RS and CSI-IM resources. DMRS is transmitted only in the BW of a respective PDSCH and a UE can use the DMRS to demodulate information in a PDSCH.

UL signals also include data signals conveying information content, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH or the UE can transmit data and some UCI in a PUSCH and transmit remaining UCI in a PUCCH when the eNB configures the UE for simultaneous PUSCH and PUCCH transmission. UCI includes hybrid automatic repeat request acknowledgement (HARQ-ACK) information, indicating correct or incorrect detection of data transport blocks (TBs) in a PDSCH, scheduling request (SR) indicating whether a UE has data in its buffer, and CSI enabling an eNB to select appropriate parameters for link adaptation of PDSCH or PDCCH transmissions to a UE.

CSI includes a channel quality indicator (CQI) informing an eNB of a DL signal to interference and noise ratio (SINR) experienced by the UE, a precoding matrix indicator (PMI) informing an eNB how to apply beam-forming for DL transmissions to the UE, and a rank indicator (RI) informing the eNB of a rank for a PDSCH transmission. UL RS includes DMRS and sounding RS (SRS). A UE transmits DMRS only in a BW of a respective PUSCH or PUCCH and an eNB can use a DMRS to demodulate information in a PUSCH or PUCCH. A UE transmits SRS to provide an eNB with an UL CSI. A SRS transmission from a UE can be periodic (P-SRS, or trigger type 0 SRS) or aperiodic (A-SRS, or trigger type 1 SRS) as triggered by a SRS request field included in a DCI format conveyed by a PDCCH scheduling PUSCH or PDSCH.

A transmission time interval (TTI) for DL transmission or for UL transmission is referred to as a subframe (SF) and includes two slots. A unit of ten SFs is referred to as a system frame. A system frame is identified by a system frame number (SFN) ranging from 0 to 1023 and can be represented by 10 binary elements (or bits). A BW unit for a DL transmission or for an UL transmission is referred to as a resource block (RB), one RB over one slot is referred to as a physical RB (PRB), and one RB over one SF is referred to as a PRB pair. Each RB consists of $N_{sc}^{RB}$ B sub-carriers, or resource elements (REs). A RE is identified by the pair of indexes (k, l) where k is a frequency domain index and l in a time domain index. An eNB informs parameters for a PDSCH transmission to a UE or parameters for a PUSCH transmission from the UE, through a DCI format with CRC scrambled by a cell radio network temporary identifier (C-RNTI), that is conveyed in a PDCCH the eNB transmits to the UE and is respectively referred to as DL DCI format or UL DCI format.

Figure 4:
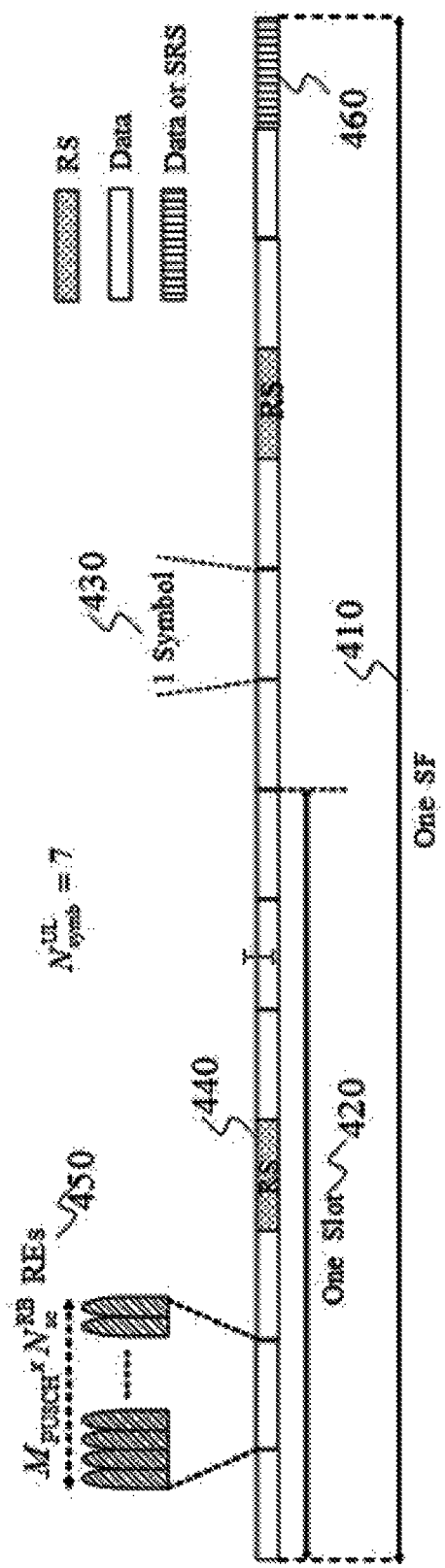
FIG. 4 illustrates a PUSCH transmission structure.

FIG. 4 illustrates a PUSCH transmission structure.

A SF 410 includes two slots. Each slot 420 includes $N_{symb}^{UL}$ symbols 430 for transmitting data information, UCI or RS. Some PUSCH symbols in each slot are used for transmitting DMRS 440. Each RB includes $N_{sc}^{RB}$ REs and a UE is allocated $M_{PUSCH}$ RBs 450 for a total of $M_{sc}^{PUSCH}=M_{PUSCH} \cdot N_{sc}^{RB}$ REs for a PUSCH transmission BW. A last SF symbol can be used to multiplex SRS transmissions 460 from one or more UEs. A number of SF symbols available for data/UCI/DMRS transmission is $N_{symb}^{PUSCH}=2\cdot(N_{symb}^{UL}-1)-N_{SRS}$, where $N_{SRS}=1$ when the last SF symbol is used to transmit SRS and $N_{SRS}=0$ otherwise.

Figure 5:
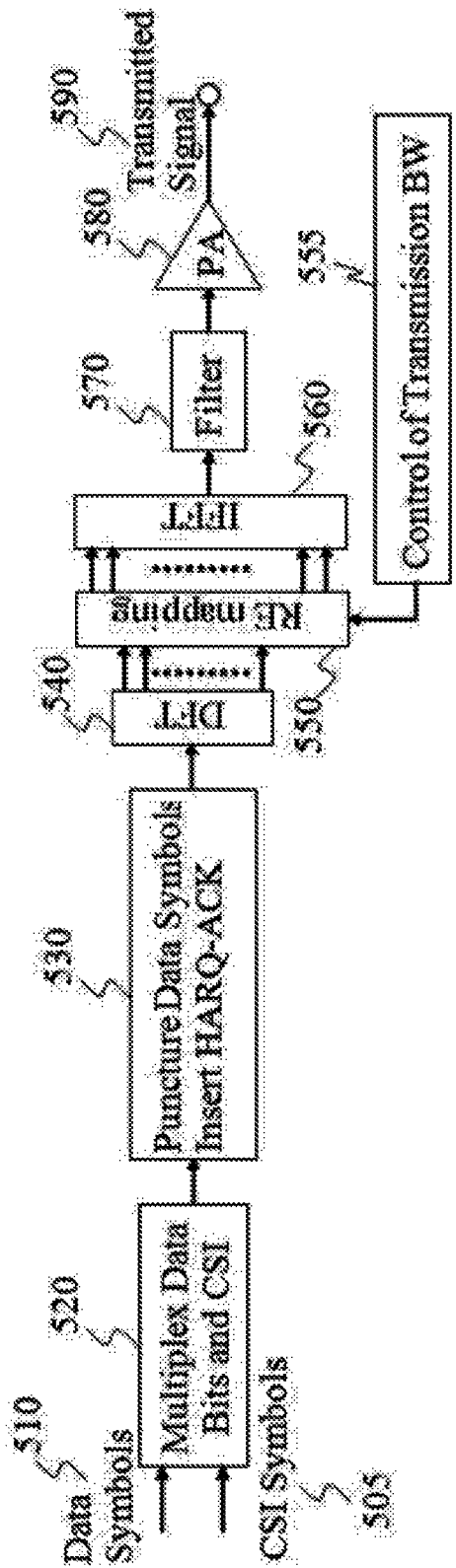
FIG. 5 illustrates a transmitter block diagram for data information and uplink control information (UCI) in a PUSCH according to some embodiments of the present disclosure.

FIG. 5 illustrates a transmitter block diagram for data information and UCI in a PUSCH according to according to some embodiments of the present disclosure.

Coded CSI symbols 505 and coded data symbols 510 are multiplexed by multiplexer 520. Coded HARQ-ACK symbols are then inserted by multiplexer 530 by puncturing data symbols and/or CSI symbols. A transmission of coded RI symbols is similar to one for coded HARQ-ACK symbols (not shown). A discrete Fourier transform (DFT) is obtained by DFT unit 540, REs 550 corresponding to a PUSCH transmission BW are selected by selector 555, an inverse fast Fourier transform (IFFT) is performed by IFFT unit 560, an output is filtered and by filter 570 and applied a certain power by power amplifier (PA) 580 and a signal is then transmitted 590. For brevity, additional transmitter circuitry such as digital-to-analog converter, filters, amplifiers, and transmitter antennas as well as encoders and modulators for data symbols and UCI symbols are omitted for brevity.

Figure 6:
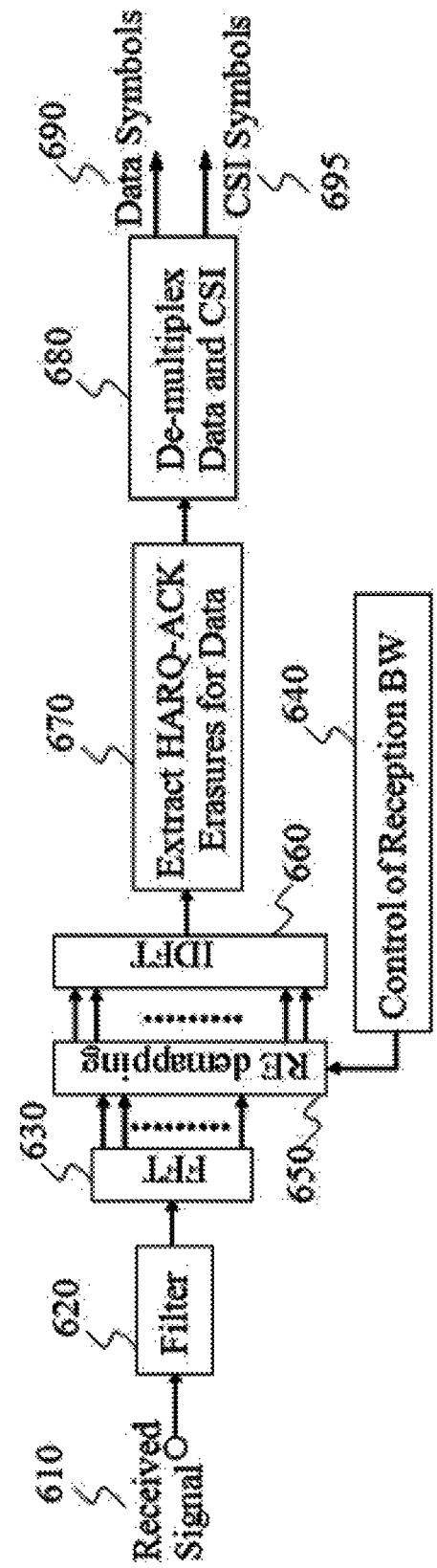
FIG. 6 illustrates a receiver block diagram for data information and UCI in a PUSCH according to some embodiments of the present disclosure.

FIG. 6 illustrates a receiver block diagram for data information and UCI in a PUSCH according to some embodiments of the present disclosure. The embodiment of the receiver block diagram shown in FIG. 6 is for illustration only. Other embodiments could be used without departing from the scope of this disclosure.

A received signal 610 is filtered by filter 620, a fast Fourier transform (FFT) is applied by FFT unit 630, a selector unit 640 selects REs 650 used by a transmitter, an inverse DFT (IDFT) unit applies an IDFT 660, a de-multiplexer 670 extracts coded HARQ-ACK symbols and places erasures in corresponding REs for data symbols and CSI symbols and finally another de-multiplexer 680 separates coded data symbols 690 and coded CSI symbols 695. A reception of coded RI symbols is similar to one for coded HARQ-ACK symbols (not shown). Additional receiver circuitry such as a channel estimator, demodulators and decoders for data and UCI symbols are not shown for brevity.

A DMRS or SRS transmission can be through a transmission of a respective Zadoff-Chu (ZC) sequence. For a UL system BW of $N_{RB}^{max,UL}$ RBs, a sequence $r_{u,v}^{(\alpha)}(n)$ can be defined by a cyclic shift (CS) α of a base sequence $\bar{r}_{u,v}(n)$ according to $r_{u,v}^{(\alpha)}(n)=e^{j\alpha n}\bar{r}_{u,v}(n)$, $0 \le n < M_{sc}^{RS}$, where $M_{sc}^{RS}=mN_{sc}^{RB}$ is a sequence length, $1 \le m \le N_{RB}^{max,UL}$, and $\bar{r}_{u,v}(n)=x_q(n \mod N_{ZC}^{RS})$ where the $q^{th}$ root ZC sequence is defined by $$x_q(m) = \exp\left(\frac{-j\pi qm(m+1)}{N_{ZC}^{RS}}\right),$$

$0 \le m \le N_{ZC}^{RS}-1$ with q given by $q=\lfloor \bar{q}+\frac{1}{2} \rfloor + v \cdot (-1)^{\lfloor 2\bar{q} \rfloor}$ and $\bar{q}$ given by $\bar{q}=N_{ZC}^{RS} \cdot (u+1)/31$. A length $N_{ZC}^{RS}$ of a ZC sequence is given by a largest prime number such that $N_{ZC}^{RS}<M_{sc}^{RS}$. Multiple RS sequences can be defined from a single base sequence using different values of α.

Figure 7:
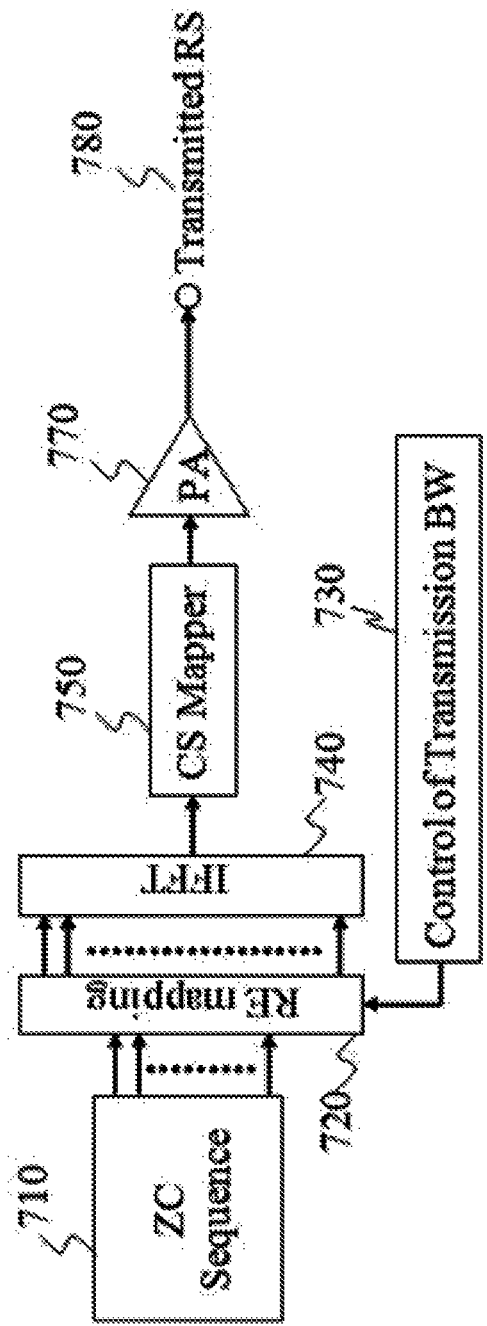
FIG. 7 illustrates an example transmitter structure for a Zadoff-Chu (ZC) sequence according to some embodiments of the present disclosure.

FIG. 7 illustrates an example transmitter structure for a ZC sequence according to some embodiments of the present disclosure. The embodiment of the transmitter structure shown in FIG. 7 is for illustration only. Other embodiments could be used without departing from the scope of this disclosure.

A ZC sequence 710 of length $M_{sc}^{RS}$ REs is mapped by mapper 720 to REs of a transmission BW as they are indicated by RE selection unit 730. The mapping can be performed to consecutive REs for a DMRS or to every other RE for a SRS thereby creating a comb spectrum with repetition factor two (or every fourth REs for repetition factor of four and so on). Subsequently, an IFFT is performed by IFFT filter 740, a CS is applied to the output by CS mapper 750, and a resulting signal is filtered by filter 760. A transmission power is applied by power amplifier 770 and the RS is transmitted 780.

Figure 8:
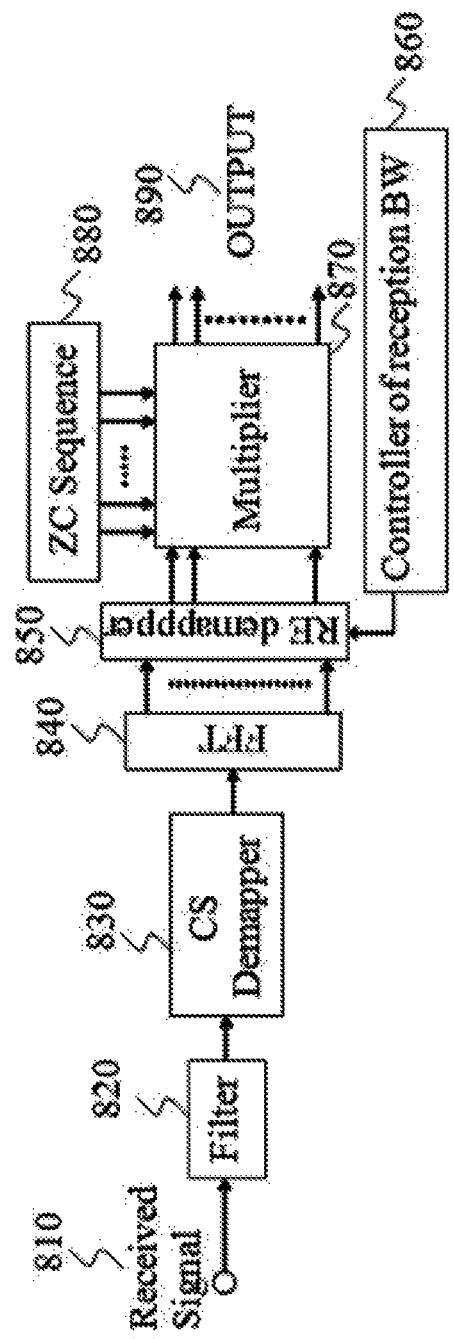
FIG. 8 illustrates an example receiver structure for a ZC sequence according to some embodiments of the present disclosure.

FIG. 8 illustrates an example receiver structure for a ZC sequence according to some embodiments of the present disclosure. The embodiment of the receiver structure for a ZC sequence shown in FIG. 8 is for illustration only. Other embodiments could be used without departing from the scope of this disclosure.

A received signal 810 is filtered by filter 820, a CS is restored by CS demapper 830, a FFT is applied by filter 840, a RE demapper 850 selects REs indicated by a controller of reception BW 860, a resulting signal is correlated by complex multiplier 870 with a replica 880 of a ZC sequence, and an output 890 can then be provided to a channel estimator such as a time-frequency interpolator.

Table 1 below provides a number of combinations for a SRS transmission BW. An eNB can signal a cell specific SRS BW configuration c through system information. For example, 3 bits can indicate one of the eight configurations in Table 1. The eNB can then assign to each UE a SRS transmission BWs $m_{SRS,b}^c$ (in RBs) by indicating the value of b for SRS BW configuration c. For P-SRS, this can be by higher layer signaling of 2 bits. For A-SRS, this can be by a respective DCI format dynamically indicating one BW from a set of BWs configured to a UE by higher layer signaling. A variation in a maximum SRS BW is primarily intended to avoid a varying total BW allocation for PUCCH transmissions at the two edges of an UL BW. The eNB can also signal through system information cell specific SRS transmission SFs.

TABLE 1

$m_{SRS,b}^c$ RB values for UL BW of $N_{RB}^{UL}$ RBs with $80 < N_{RB}^{UL} \leq 110$.

| SRS BW configuration | b = 0 | b = 1 | b = 2 | b = 3 |
|---|---|---|---|---|
| c = 0 | 96 | 48 | 24 | 4 |
| c = 1 | 96 | 32 | 16 | 4 |
| c = 2 | 80 | 40 | 20 | 4 |
| c = 3 | 72 | 24 | 12 | 4 |
| c = 4 | 64 | 32 | 16 | 4 |
| c = 5 | 60 | 20 | Not Applicable | 4 |
| c = 6 | 48 | 24 | 12 | 4 |
| c = 7 | 48 | 16 | 8 | 4 |

A UE transmits a SRS on per cell SRS resources based on a trigger type 0 when the SRS transmission is triggered by higher layer signaling or on a trigger type 1 when the SRS transmission is triggered by a detection of DCI formats 0/4/1A for FDD and TDD and DCI formats 2B/2C/2D for TDD. A SRS request field has size of 1 bit for DCI formats 0/1A/2B/2C/2D, with a type 1 SRS triggered when a value of the SRS request field is set to '1'. A SRS request field has size of 2 bits for DCI format 4 and a mapping for the two bits can be as in Table 2. In case both trigger type 0 and trigger type 1 SRS transmissions would occur in a same SF and in a same cell, a UE transmits only the trigger type 1 SRS. Transmission parameters for trigger type 0 SRS or trigger type 1 SRS are cell specific and are configured to a UE by higher layers. For brevity, a trigger type 0 SRS will be referred to as periodic SRS (P-SRS) and a trigger type 1 SRS will be referred to as aperiodic SRS (A-SRS). Higher layer configuration can be UE-specific through radio resource control (RRC) signaling or cell-specific through system information signaling.

TABLE 2

SRS request value for trigger type 1 in DCI format 4

| Value of SRS request field | Description |
|---|---|
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

In a TDD communication system, the communication direction in some SFs is in the DL and in some other SFs is in the UL. Table 3 provides indicative TDD UL-DL configurations over a period of one system frame. "D" denotes a DL SF, "U" denotes an UL SF, and "S" denotes a special SF that includes a DL transmission field referred to as DwPTS, a Guard Period (GP), and an UL transmission field referred to as uplink pilot time slot (UpPTS). Several combinations exist for the duration of each field in a special SF subject to the condition that the total duration is one SF.

TABLE 3

TDD UL-DL configurations

| TDD UL-DL Configuration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In TDD, a UE configured for A-SRS transmission on cell c, upon detection of a positive SRS request in SF n of cell c, transmits SRS in the first SF satisfying n+k, k≥4 and $(10 \cdot n_f + k_{SRS} - T_{offset,1}) \bmod T_{SRS,1} = 0$ for $T_{SRS,1} > 2$, or $(k_{SRS} - T_{offset,1}) \bmod 5 = 0$ for $T_{SRS,1} = 2$ where $k_{SRS}$ is defined in Table 4 or as in Table 4A.

TABLE 4 for TDD for UpPTS length of 2 symbols or 1 symbol
SF index n

| | 1 | | | | | 6 | | | | |
|---|---|---|---|---|---|---|---|---|---|---|
| 0 | 1st symbol of UpPTS | 2nd symbol of UpPTS | 2 | 3 | 4 | 5 | 1st symbol of UpPTS | 2nd symbol of UpPTS | 7 | 8 | 9 |
| 0 | | 1 | 2 | 3 | 4 | 5 | | 6 | 7 | 8 | 9 |
| 1 | | | 2 | 3 | 4 | 6 | | | 7 | 8 | 9 |

TABLE 4A k_SRS for TDD in case of UpPTS of 4 symbols

| SF index n | | | | | | | | | | |
|---|---|---|---|---|---|---|---|---|---|---|
| 0 | 1 | | | | 2 3 5 4 | 6 | | | | 7 8 9 |
| | 1st symbol of UpPTS | 2nd symbol of UpPTS | 3rd symbol of UpPTS | 4th symbol of UpPTS | | 1st symbol of UpPTS | 2nd symbol of UpPTS | 3rd symbol of UpPTS | 4th symbol of UpPTS | |
| | 0 2 | 1 3 | 2 | 3 | | 5 7 | 6 8 | 7 | 8 | |

In a TDD cell, an eNB configures a UE an A-SRS periodicity, $T_{SRS,1}$, and an A-SRS SF offset, $T_{offset,1}$, as defined in Table 5. $T_{SRS,1}$ is cell specific and is selected from the set {2, 5, 10} SFs. For $T_{SRS,1}$=2 SFs, two SRS resources are configured in a half frame containing UL SF(s) of the given cell.

TABLE 5

UE Specific Periodicity $T_{SRS,1}$ and SF Offset Configuration $T_{offset,1}$ for A-SRS in TDD

| SRS Configuration Index $I_{SRS}$ | SRS Periodicity $T_{SRS,1}$ (SFs) | SRS SF Offset $T_{offset,1}$ |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

One mechanism towards satisfying a demand for increased network capacity and data rates is network densification. This is realized by deploying small cells in order to increase a number of network nodes and their proximity to UEs and provide cell splitting gains. As a number of small cells increases and deployments of small cells become dense, a handover frequency and a handover failure rate can also significantly increase. By maintaining the RRC connection to the macro-cell, communication with the small cell can be optimized as control-plane (C-plane) functionalities such as mobility management, paging, and system information updates can be provided only by the macro-cell while a small-cell can be dedicated for user-data plane (U-plane) communications. If a latency of a backhaul link between network nodes (cells) is practically zero, carrier aggregation (CA) can be used as in REF 3 and scheduling decisions can be made by a central entity and conveyed to each network node. When a propagation delay for a UE transmission is not same for different cells, cells can be grouped according to a propagation delay and each group can be associated with a different timing advance group (TAG) command.

Figure 9:
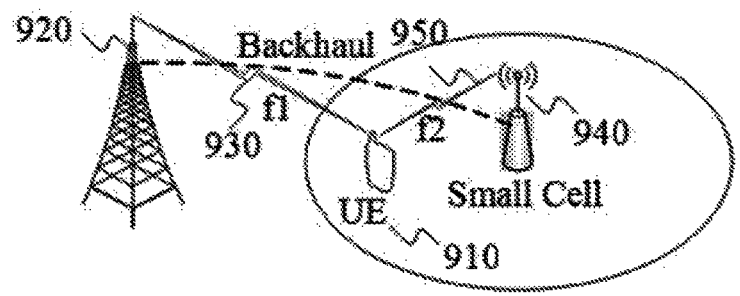
FIG. 9 is a diagram illustrating a communication using CA according to some embodiments of the present disclosure.

FIG. 9 is a diagram illustrating a communication using CA according to some embodiments of the present disclosure. The embodiment shown in FIG. 9 is for illustration only. Other embodiments could be used without departing from the scope of this disclosure.

A UE 910 communicates with a first eNB in one cell 920 corresponding to a macro-cell using a first carrier frequency f1 930 and with a second eNB in a second cell 940 corresponding to a small cell over carrier frequency f2 950. The first eNB and the second eNB are connected over a backhaul that introduces negligible latency. It is also possible for the first eNB and the second eNB to be a same eNB and the first cell and the second cell to correspond to different carrier frequencies.

A UE monitors PDCCH transmissions providing UE-common information from an eNB in a common search space (CSS). In case of CA, the CSS is located in one cell that is referred to as primary cell (PCell). The UE transmits PUCCH in the PCell. The eNB can also configure the UE for PUCCH transmissions for UCI associated with a cell group in a primary secondary cell (PSCell). A group of cells with associated UCI transmission on PUCCH of the PCell is referred to as primary cell group (PCG) and a group of cells with associated UCI transmission on PUCCH of the PSCell is referred to as secondary cell group (SCG). Unless explicitly otherwise mentioned, the following descriptions apply to both PCG and SCG but, for brevity, differentiation between PCG and SCG or between PCell and PSCell is not considered.

A setting of a UE transmit power $P_{SRS}$ for a SRS transmitted in SF i for cell c is defined as in Equation 1:

$$P_{SRS,c}(i) = \min\{P_{CMAX,c}(i), P_{SRS\_OFFSET,c}(m) + 10\log_{10}(M_{SRS,c}) + P_{O\_PUSCH,c}(1) + \alpha_c(1) \cdot PL_c + f_c(i)\} \text{ [dBm]} \quad \text{(Equation 1)}$$

where:

$P_{CMAX,c}(i)$ is a configured UE transmit power in SF i for cell c;

$P_{SRS\_OFFSET,c}(m)$ is configured by higher layers for P-SRS (m=0) and for A-SRS (m=1) for cell c;

$M_{SRS,c}$ is an SRS transmission BW in SF i for cell c expressed in number of RBs;

$f_c(i) = f_c(i-1) + \delta_{PUSCH,c}(i-K_{PUSCH})$ when accumulation of transmission power control (TPC) commands $\delta_{PUSCH,c}(i-K_{PUSCH})$ is enabled by higher layers for cell c and $f_c(t) = \delta_{PUSCH,c}(i-K_{PUSCH})$ when accumulation of TPC commands $\delta_{PUSCH,c}(i-K_{PUSCH})$ is not enabled by higher layers for cell c where $\delta_{PUSCH,c}(i-K_{PUSCH})$ is a TPC command that the UE is provided by a DCI format 3/3A that has a CRC scrambled with a TPC-PUSCH-RNTI that the UE is configured by higher layers and DCI format 3 includes TPC commands represented by 2 bits and DCI format 3A includes TPC commands represented by 1 bit; and $P_{O\_PUSCH,c}(1)$ and $\alpha_c(1)$ are configured by higher layers for a PUSCH transmission in cell c where $P_{O\_PUSCH,c}(1)$ is a sum of a cell-specific component and a UE-specific component (see also REF 3).

For an UL transmission (PUSCH, PUCCH, SRS) over a number of antenna ports, a transmit power is first scaled by a ratio of the number of antennas ports to the number of antenna ports for the UL transmission. A resulting scaled power is then split equally across the antenna ports of the UL transmission.

When a total UE transmit power for SRS would exceed $\hat{P}_{CMAX}(i)$, the UE scales $\hat{P}_{SRS,c}(i)$ for the cell c in SF i such that the condition in following Equation 2 is satisfied:

$$\sum_c w(i) \cdot \hat{P}_{SRS,c}(i) \leq \hat{P}_{CMAX}(i) \quad \text{(Equation 2)}$$

where $\hat{P}_{SRS,c}(i)$ is a linear value of $P_{SRS,c}(i)$, $\hat{P}_{CMAX}(i)$ is a linear value of $P_{CMAX}$ in SF i and w(i) is a scaling factor of $\hat{P}_{SRS,c}(i)$ for cell c where $0 < w(i) \leq 1$. The w(i) values are same across cells.

A UE configured for A-SRS transmission in cell c and not configured with a carrier indicator field (CIF), transmits A-SRS in cell c upon detection of a positive SRS request in PDCCH scheduling PUSCH/PDSCH on serving cell c. A UE configured for A-SRS transmission in cell c and configured with a CIF, transmits SRS in cell c upon detection of a positive SRS request in PDCCH scheduling PUSCH/PDSCH with the CIF value corresponding to cell c.

A UE can provide a power headroom (PH) report to an eNB in order for the eNB to obtain an estimate of an available power at the UE for UL transmissions. For example, a Type 1 PH report when a UE transmits PUSCH without PUCCH in SF i for cell c is defined as in Equation 3:

$$PH_{type1,c}(i) = P_{CMAX,c}(i) - \{10 \log_{10}(M_{PUSCH,c}(i)) + P_{O\_PUSCH,c}(1) + \alpha_c(1) \cdot PL_c + \Delta_{TF,c}(i) + f_c(i)\} \text{ [dB]} \quad \text{(Equation 3)}$$

When a UE does not transmit PUSCH in SF i for cell c, a type 1 PH report (virtual PH report) is defined as in following Equation 4, where $\tilde{P}_{CMAX,c}(i)$ is computed as described in REF 3.

$$PH_{type1,c}(i) = \tilde{P}_{CMAX,c}(i) - \{P_{O\_PUSCH,c}(1) + \alpha_c(1) \cdot PL_c + f_c(i)\} \text{ [dB]} \quad \text{(Equation 4)}$$

For TDD systems, DL transmissions and UL transmissions are over a same BW and therefore, a DL transmission from an eNB to a UE and an UL transmission from the UE to the eNB experience a same channel. As a consequence, an eNB can obtain a PMI (for DL beam-forming using channel reciprocity) for a UE from a reception of an SRS transmission from the UE. Further, although an interference experienced at a UE for DL a transmission from an eNB can be different than an interference experienced at the eNB for an UL transmission from the UE, as the eNB and the UE are not collocated, there can be operating conditions when a similar interference is observed. In such case, a SRS transmission can also provide a CQI estimate for DL transmissions as the SRS transmission already also provides a channel response estimate. For example, for UEs in close proximity to the eNB and for similar eNB and UE elevations, such as when the eNB and the UE are located indoors or when the eNB and the UE are located outdoors but the eNB elevation is relatively low, a similar interference can be experienced by the UE and the eNB.

Due to data traffic patterns that tend to be larger in the DL than in the UL, UE complexity aspects, and regulatory requirements related to emissions, a CA-capable UE typically supports or is configured to support a much smaller number of UL cells than a number of DL cells. For example, a UE can be configured CA operation with more than five DL cells and with only one or two UL cells. In such case and for a TDD system, a UE is not capable of transmitting SRS to an eNB in some DL cells and therefore, in order to enable link adaptation for DL transmissions from the eNB to the UE, the UE needs to measure and report CSI, including CQI, PMI, and RI, to the eNB for the DL cells. This increases UE computational complexity, memory requirements, and power consumption and also increases overhead in UL transmissions in order to include CSI feedback for a potentially large number DL cells.

Fast carrier switching is considered for SRS transmissions so that a UE can transmit SRS even in a cell where the UE is configured for DL transmission but is not configured for UL transmission. Such a functionality presents a series of new design issues including:

a) Mechanisms to determine a SRS transmission power in cells where a UE is not configured for UL transmissions.

b) Mechanisms to provide PH report for a cell where a UE transmits SRS and the UE is not configured for other UL transmissions.

c) Prioritization of power allocation when a UE is configured to simultaneously transmit SRS in a cell where the UE is configured for UL transmissions and in a cell where the UE is not configured for other UL transmissions.

d) Mechanisms to provide timing for an A-SRS transmission from a UE in a cell where the UE is not configured for other UL transmission in order to avoid simultaneous transmission of the A-SRS in the cell and PUSCH/PUCCH transmission in other cells.

e) Mechanisms to trigger A-SRS transmissions in cells where a UE is not configured for other UL transmissions.

Therefore, there is a need to provide mechanisms for determining a SRS transmission power in cells where a UE is not configured for UL transmissions.

There is another need to define a PH report for a cell where a UE transmits SRS and the UE is not configured for other UL transmissions in the cell.

There is another need to establish prioritization rules for power allocation to SRS transmission when a UE is configured to simultaneously transmit SRS in cells where the UE is configured for other UL transmissions and in cells where the UE is not configured for UL transmissions.

There is another need to provide mechanisms for timing of an A-SRS transmission from a UE in a cell where the UE is not configured for other UL transmissions in order to avoid simultaneous transmission of the A-SRS in the cell and PUSCH/PUCCH transmissions in other cells.

Also, there is a need to provide mechanisms for triggering A-SRS transmissions in cells where a UE is not configured for other UL transmissions.

In the following, unless otherwise explicitly mentioned, reference is with respect to a UE transmitting P-SRS or A-SRS in a TDD cell where the UE is either configured for other UL transmissions or not configured for other UL transmissions.

SRS Transmission Power Control

Various embodiments of the present disclosure consider mechanisms to enable power control of SRS transmissions from a UE in a cell where the UE is not configured for other UL transmissions in the cell.

In Equation 1, a power for a P-SRS transmission or for an A-SRS transmission is defined relative to a power for a PUSCH transmission. In a cell c where a UE transmits P-SRS or A-SRS and the UE does not have a PUSCH transmission, power control parameters for P-SRS transmission or for A-SRS transmission that are derived from a PUSCH transmission power need to be separately configured to the UE from an eNB by higher layers. These parameters include $P_{SRS\_OFFSET,c}(m)$, $P_{O\_PUSCH,c}(1)$, and $\alpha_c(1)$. In addition, the eNB needs to configure the UE with TPC commands for P-SRS transmission or for A-SRS transmissions in cell c. Further, the eNB needs to configure the UE by higher layers a $P_{CMAX,c}(i)$ value for c.

In Equation 1, the eNB configures the UE by higher layers a parameter $P_{O\_PUSCH,c}(1)$ in cell c and a parameter $P_{SRS\_OFFSET,c}(m)$ to offset a transmission power for P-SRS (m=0) or for A-SRS (m=1) relative to a PUSCH transmission power. The parameter $P_{O\_PUSCH,c}(1)$ has a cell-specific component and a UE-specific component (see also REF 3). For a cell c where a UE is not configured for other UL transmissions, new parameters $P_{O\_SRS,c}(m)$ are defined and configured by higher layers to the UE for P-SRS (m=0) transmission and for A-SRS (m=1) transmission and there is no need for higher layers to configure respective $P_{O\_PUSCH,c}(1)$ and $P_{SRS\_OFFSET,c}(m)$ parameters. Similar to $P_{O\_PUSCH,c}(1)$, $P_{O\_SRS,c}(m)$ can be a sum of a cell-specific component and a UE-specific component.

In a first approach, TPC commands for a number of cells where a UE is configured for P-SRS transmission or for A-SRS transmission can be provided by a DCI Format 3/3A with CRC scrambled with a TPC-PUSCH-RNTI that is configured to the UE by higher layers. The DCI Format 3/3A is conveyed by a PDCCH transmitted in the CSS of a cell that is the PCell for the UE. The TPC-PUSCH-RNTI can be same as the one configured to the UE for PUSCH transmissions and the locations of TPC commands for cells without PUSCH transmissions from a UE can either be separately configured or be consecutive and follow the locations of TPC commands for cells with PUSCH transmissions.

In a second approach, a UE can be configured by higher layers a new RNTI type, TPC-SRS-RNTI, and the UE can monitor a DCI Format 3/3A with CRC scrambled with the TPC-SRS-RNTI to obtain TPC commands for P-SRS transmissions or for A-SRS transmission in cells where the UE is not configured for other UL transmissions. The second approach can be beneficial in allowing a different transmission rate of TPC commands among PUSCH/SRS transmissions in cells where a UE is configured PUSCH transmissions and SRS transmissions in cell where the UE is not configured for other UL transmissions. The second approach is also beneficial in maintaining an existing eNB implementation for a DCI Format 3/3A with CRC scrambled by a TPC-PUSCH-RNTI.

A parameter tpc-Index-SRS is provided by higher layers to a UE, for a cell where the UE is configured to transmit P-SRS or A-SRS and the UE is not configured for other UL transmissions, to indicate to the UE a location of bits in a DCI Format 3/3A for the UE to obtain a TPC command to adjust a SRS transmission power in the cell. Upon detecting a DCI Format 3/3A with CRC scrambled with a TPC-PUSCH-RNTI, or with a TPC-SRS-RNTI, the UE applies the TPC command obtained from bits of DCI Format 3/3A in the location indicated by the parameter tpc-Index-SRS for cell c to adjust a P-SRS transmission power or an A-SRS transmission power in cell c.

A setting of a UE transmit power $P_{SRS,c}(i)$ for a SRS transmitted in SF i for cell c where the UE is configured to transmit only SRS is defined as in following Equation 5:

$$P_{SRS,c}(i) = \min\{P_{CMAX,c}(i), 10 \log_{10}(M_{SRS,c}) + P_{O\_SRS,c}(m) + \alpha_{SRS,c} \cdot PL_c + f_c(i)\} \text{ [dBm]} \quad \text{(Equation 5)}$$

where:
$P_{CMAX,c}(i)$ is a maximum UE transmit power in SF i for cell c configured to the UE by higher layers;
$P_{O\_SRS,c}(m)$ is configured to the UE by higher layers;
$M_{SRS,c}$ is an SRS transmission BW in SF i for cell c expressed in number of RBs;
$f_c(i) = f_c(i-1) - \delta_{PUSCH,c}(i-K_{PUSCH})$ when accumulation of TPC commands $\delta_{PUSCH,c}(i-K_{PUSCH})$ is enabled by higher layers for cell c and $f_c(i) = \delta_{PUSCH,c}(i-K_{PUSCH})$ when accumulation of TPC commands $\delta_{PUSCH,c}(i-K_{PUSCH})$ is not enabled by higher layers for cell c where $\delta_{PUSCH,c}(i-K_{PUSCH})$ is a TPC command that the UE is provided by a DCI format 3/3A with a CRC scrambled with a TPC-PUSCH-RNTI or with a TPC-SRS-RNTI that the UE is configured by higher layers and at a location determined by a parameter tpc-Index-SRS that the UE is configured by higher layers for cell c; and
$\alpha_{SSR,c}$ is configured by higher layers for a SRS transmission in cell c.

In a different realization, the structure of Equation 1 can be maintained and parameters $P_{O\_PUSCH,c}(1)$ and $P_{SRS\_OFFSET,c}(m)$ can be introduced for a cell where a UE is configured only SRS transmission. Therefore, Equation 5 can apply by substituting $P_{O\_SRS,c}(m)$ with $P_{SRS\_OFFSET,c}(m) + P_{O\_PUSCH,c}(1)$. As a signaling optimization, it is possible to avoid configuration by higher layers of $P_{O\_PUSCH,c}(1)$ and instead use the value configured for another cell such as the PCell $P_{O\_PUSCH,c0}(1)$ as the reference value.

A UE can determine an initial transmission power for a P-SRS (type 0 SRS) or an A-SRS (type 1 SRS) on a cell where the UE does not have other configured transmissions from Equation 5 by setting $f_c(0) = 0$ and therefore using only the open-loop component of the power control formula in Equation 5 to determine the initial transmission power. Alternatively, as it is subsequently described, when the UE performs random access on a cell prior to SRS transmission, the value for $f_c(0)$ can be determined based on a transmission power resulting to a successful completion of the random access.

A PH report for a P-SRS transmission or an A-SRS transmission in SF i for cell c is computed as in Equation 6.

$$PH_{type3,c}(i) = P_{CMAX,c}(i) - \{10 \log_{10}(M_{SRS,c}(i)) + P_{O\_SRS,c}(m) + \alpha_{SRS,c} \cdot PL_c + f_c(i)\} \text{ [dB]} \quad \text{(Equation 6)}$$

As same TPC commands apply for P-SRS transmission and for A-SRS transmission and an eNB knows the difference between $P_{O\_SRS,c}(0)$ and $P_{O\_SRS,c}(1)$ a single PH report can be provided and can be with reference either to P-SRS using $P_{O\_SRS,c}(0)$ or to A-SRS using $P_{O\_SRS,c}(1)$.

When a UE does not transmit P-SRS or A-SRS in SF i for cell c, a PH report is computed as in Equation 7 where $\hat{P}_{CMAX,c}(i)$ is computed as described in REF 3. As for Equation 6, the PH report can be provided relative to either $P_{O\_SRS,c}(0)$ or $P_{O\_SRS,c}(1)$.

$$PH_{type3,c}(i) = \hat{P}_{CMAX,c}(i) - \{P_{O\_SRS,c}(m) + \alpha_{SRS,c} \cdot PL_c + f_c(i)\} \text{ [dB]} \quad \text{(Equation 7)}$$

When a total UE transmit power for SRS would exceed $\hat{P}_{CMAX}(i)$, instead of the UE scaling $\hat{P}_{SRS,c}(i)$ for the cell c in SF i with a same weight $0 < w(i) \leq 1$ so that the condition $$\sum_c w(i) \cdot \hat{P}_{SRS,c}(i) \leq \hat{P}_{CMAX}(i)$$

is satisfied, in a first approach the UE prioritizes power allocation to P-SRS transmissions or A-SRS transmissions in cells where the UE is also configured for other UL transmissions and the UE drops P-SRS transmissions or A-SRS transmissions, respectively, in cells where the UE is not configured for other UL transmissions. This is because a SRS transmission in a cell where the UE is also configured for other UL transmissions can be beneficial for both PDSCH and PUSCH link adaptation while a SRS transmission in a cell where the UE is not configured for other UL transmissions can be beneficial only for PDSCH link adaptation.

In a second approach, the UE prioritizes power allocation to P-SRS transmissions over other P-SRS transmissions, or power allocation of A-SRS transmissions over other A-SRS transmissions, in cells where the UE is also configured for other UL transmissions and the UE scales a power of SRS transmissions, respectively, in cells where the UE is not configured for other UL transmissions so that the condition $$\sum_{c \in C_2} w(i) \cdot \hat{P}_{SRS,c}(i) \leq \hat{P}_{CMAX}(i) - \sum_{c \in C_1} \hat{P}_{SRS,c}(i)$$

is satisfied where $C_1$ is a set of cells where the UE is configured for other UL transmissions and the UE transmits P-SRS or A-SRS in SF i and $C_2$ is a set of cells where the UE is not configured for other UL transmissions and the UE transmits P-SRS or A-SRS in SF i. When $$\hat{P}_{CMAX}(i) - \sum_{c \in C_1} \hat{P}_{SRS,c}(i) < 0,$$

the UE drops P-SRS or A-SRS transmissions in the $C_2$ set of cells and scales $\hat{P}_{SRS,c}(i)$ for the cell c in the $C_1$ set of cells in SF i so that the condition $$\sum_{c \in C_1} w(i) \cdot \hat{P}_{SRS,c}(i) \leq \hat{P}_{CMAX}(i)$$

is satisfied. A-SRS transmission in a cell where the UE is not configured for other UL transmissions is prioritized in terms of power allocation over P-SRS transmission in a cell where the UE is configured for other UL transmissions.

Timing for A-SRS Transmission

Various embodiments of the present disclosure consider mechanisms to define timing for an A-SRS transmission.

For a cell where a UE is not configured for other UL transmissions, an A-SRS transmission is triggered by a DL DCI format, such as DL DCI format 1A/2B/2C/2D, that also schedules a transmission of data TBs to the UE. It is then likely that, in a same SF, the UE will need to transmit HARQ-ACK information in a cell where the UE is configured PUCCH transmissions (PCell or PSCell) and A-SRS transmission in a cell where the UE is not configured for other UL transmissions. Then, particularly when a number of cells where a UE can have simultaneous UL transmissions in a SF is small, such as 1 or 2, the cannot transmit both SRS and HARQ-ACK when a UE capability for simultaneous UL transmissions on different cells is exceeded, the UE will prioritize the HARQ-ACK transmission, for example on the PCell or on the PSCell, and drop the A-SRS transmission in the cell where the UE is not configured for other UL transmissions. As support of A-SRS transmissions in cells where the UE is not configured for other UL transmissions is primarily beneficial for TDD UL-DL configurations having many DL SFs and few UL SFs (DL-heavy TDD UL-DL configurations), the UE can frequently be unable to transmit the A-SRS.

In a first approach, a timing for a A-SRS transmission from a UE in a first cell where the UE is not configured for other UL transmissions can be adjusted depending on whether or not the A-SRS transmission coincides with a PUSCH/PUCCH transmission in a second cell, at least when the UE needs to drop the A-SRS transmission as the UE cannot simultaneously transmit in the first cell and in the second cell. Therefore, for an A-SRS transmission triggered by a DL DCI format transmitted in SF n, the UE transmits A-SRS in the first SF satisfying $n+k, k \geq 4$ and $(10 \cdot n_f + k_{SRS} - T_{offset,1}) \mod T_{SRS,1} = 0$ for $T_{SRS,1} > 2$, or $(k_{SRS} - T_{offset,1}) \mod 5 = 0$ for $T_{SRS,1} = 2$, and further satisfying that the UE does not drop the A-SRS transmission.

Figure 10:
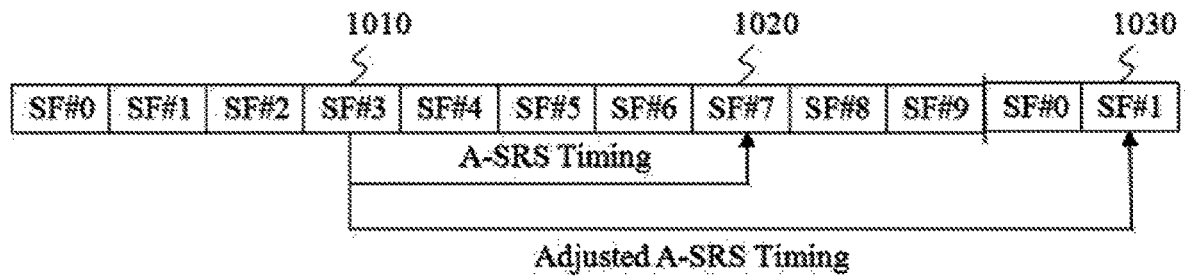
FIG. 10 illustrates timing for an A-SRS transmission from a UE in a cell where the UE is not configured for other UL transmissions according to some embodiments of the present disclosure.

FIG. 10 illustrates timing for an A-SRS transmission from a UE in a cell where the UE is not configured for other UL transmissions according to some embodiments of the present disclosure. The embodiment shown in FIG. 10 is for illustration only. Other embodiments could be used without departing from the scope of this disclosure.

A cell where a UE is not configured UL transmissions, other than SRS transmissions, uses TDD UL-DL configuration 2. The UE is configured $I_{SRS} = 2$ corresponding to $T_{SRS,1} = 2$ and $T_{offset,1} = 0, 2$ for SRS transmissions in the cell. The UE detects a DCI format triggering an A-SRS transmission in SF n=3 1010. The UE transmits the A-SRS in SF n=7 1020 when the UE is able to transmit the A-SRS based on the UE capability for a total number of UL transmissions in respective number of cells. When the UE is not able to transmit the A-SRS in SF n+4=7 based on the UE capability for a total number of UL transmissions in respective number of cells, the UE transmits the A-SRS in special SF n=1 1030 of the next frame assuming that the special SF n=1 includes two or more UpPTS symbols.

The first approach relies on an ability of an eNB receiving an A-SRS transmission from a UE to determine whether or not the UE transmits the A-SRS. For example, such an ability can be required in case the UE fails to detect a subsequent DL DCI format or UL DCI format that would have resulted to the UE transmitting PUCCH or PUSCH in the first SF in the second cell and to the UE further postponing or dropping the A-SRS transmission in the first SF in the first cell. Such an ambiguity can also exist for a P-SRS transmission and can be caused by a false detection of a DL DCI format or UL DCI format by the UE that has as a result the UE erroneously transmitting PUCCH or PUSCH and the UE dropping the P-SRS transmission due to an inability by the UE to simultaneously transmit in multiple cells.

In a second approach, to avoid a requirement for an eNB to determine whether or not a UE transmits A-SRS (or P-SRS), the A-SRS transmission in a cell where a UE is not configured for other UL transmissions can always be in the UpPTS of a special SF. This can also accommodate a retuning latency, depending on an associated value for the retuning latency, as the GP of the special SF can be used for retuning to the carrier of SRS transmission and the last UpPTS symbols or the first symbols of the next SF can be used for retuning to another carrier. In a first example, the A-SRS transmission is always in a first special SF satisfying $n+k$, $k \geq 4$. In case the UpPTS includes more than one symbol, the UpPTS symbol for A-SRS transmission (or P-SRS transmission) can be configured to the UE by higher layers or be determined from a C-RNTI for the UE. For example, for $N_{UpPTS}$ UpPTS symbols, a UE can determine an index of an UpPTS symbol for A-SRS transmission as $n_{C-RNTI}$ mod $N_{UpPTS}$ where $n_{C-RNTI}$ is the C-RNTI for the UE. Additionally, a number of UpPTS symbols where the UE transmits A-SRS can be configured to the UE by higher layers. In a second example, the A-SRS SF offset values can be modified as in Table 6. For $T_{SRS,1}=2$ or $T_{SRS,1}=5$, there is no need to provide an SRS configuration index in case of one UpPTS symbol in a special SF.

TABLE 6

UE Specific SRS Periodicity $T_{SRS,1}$ and SF Offset Configuration $T_{offset,1}$ for A-SRS in TDD.

| SRS Configuration Index $I_{SRS}$ | SRS Periodicity $T_{SRS,1}$ (SFs) | 1 symbol UpPTS SRS SF Offset $T_{offset,1}$ | 2 symbols UpPTS SRS SF Offset $T_{offset,1}$ |
|---|---|---|---|
| 0 | reserved | reserved | reserved |
| 1 | 2 | 0 | 0 |
| 2 | 2 | reserved | 1 |
| 3 | 2 | 0 | 0 |
| 4 | 2 | reserved | 1 |
| 5 | 2 | 0 | 0 |
| 6 | 2 | reserved | 1 |
| 7 | 2 | reserved | reserved |
| 8 | 2 | reserved | reserved |
| 9 | 2 | reserved | reserved |
| 10-14 | 5 | 0 for $I_{SRS}=10$, reserved for other $I_{SRS}$ | 0 for $I_{SRS}=10$, 1 for $I_{SRS}=11$, reserved for other $I_{SRS}$ |
| 15-24 | 10 | 0 for $I_{SRS}=10, 5$ for $I_{SRS}=20$ reserved for other $I_{SRS}$ | 0/1 for $I_{SRS}=10/11$, 5/6 for $I_{SRS}=20/21$ reserved for other $I_{SRS}$ |
| 25-31 | reserved | reserved | reserved |

In a third approach, when a UE is configured to transmit P-SRS or A-SRS in a first cell in a SF and the UE is also configured to transmit PUSCH or PUCCH in a second cell in the SF and a UE capability for a number of cells with simultaneous transmission is exceeded, the UE can be configured whether to puncture/suspend PUSCH or PUCCH transmission in the second cell in SF symbols where the UE transmits P-SRS or A-SRS in the first cell or drop the P-SRS or A-SRS transmission. For example, when configured, the UE suspends PUCCH or PUSCH transmission in the second cell in a last SF symbol and the UE transmits P-SRS or A-SRS in the last SF symbol in the first cell. The suspension of the PUCCH or PUSCH transmission in the second cell in the last SF symbol applies even in SFs that are not configured for SRS transmission in the second cell or even when the PUSCH/PUCCH transmission does not overlap in BW with a cell-specific maximum SRS transmission BW in the second cell. For a PUCCH Format 2 transmission, when the UE does not puncture the last SF symbol by default, the system operation can specify that the UE to drops either the SRS transmission or the PUCCH Format 2 transmission.

Figure 11:
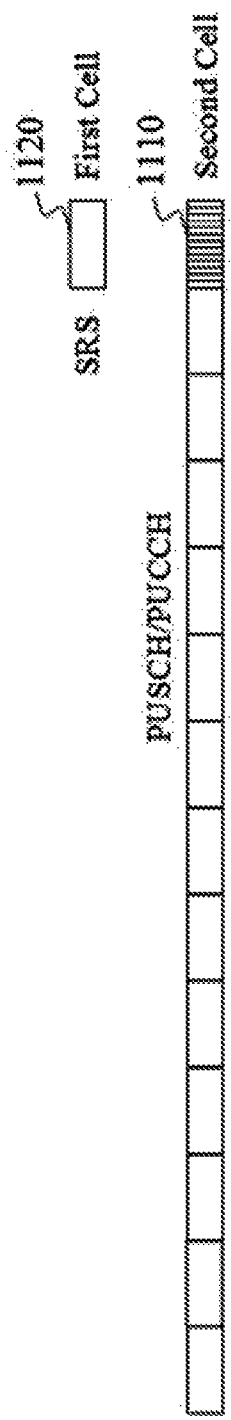
FIG. 11 illustrates puncturing of a last SF symbol for a PUSCH or PUCCH transmission in a second cell in order to transmit SRS in a first cell according to some embodiments of the present disclosure.

FIG. 11 illustrates puncturing of a last SF symbol for a PUSCH or PUCCH transmission in a second cell in order to transmit SRS in a first cell according to some embodiments of the present disclosure. The embodiment shown in FIG. 11 is for illustration only. Other embodiments could be used without departing from the scope of this disclosure.

A UE transmits PUSCH or PUCCH in a second cell and a SRS in a first cell in a same SF. An eNB configures the UE to suspend the PUSCH or PUCCH transmission in the last SF symbol and transmit SRS in a cell where the UE is not configured other UL transmissions. The UE suspends the PUSCH or PUCCH transmission in the last SF symbol 1110 in the second cell and the UE transmits SRS in the first cell 1120.

When a retuning latency is large enough for a UE to need to retune to a carrier of SRS transmission from a carrier of PUCCH transmission prior to the completion of PUCCH transmissions (that is, prior to the end of a SF) or for the UE to need to retune from a carrier of SRS transmission to a carrier of PUCCH transmission after the start of PUCCH transmissions (that is, after the start of a SF), orthogonal multiplexing in the time domain of a PUCCH transmission from the UE with PUCCH transmissions from other UEs using orthogonal covering codes across each slot of a SF is not possible, particularly when different UEs require different retuning latencies according to their capabilities.

To maintain a capability for orthogonal multiplexing of PUCCH transmissions on a same PRB pair, regardless of a retuning latency, and avoid near-far effects for received PUCCHs transmitted from different UEs, multiplexing can be limited only in the cyclic shift domain by precluding orthogonal multiplexing in the time domain through the use of different orthogonal covering codes (OCCs). A resulting resource allocation and respective PUCCH transmitter and receiver structures are described in REF 6 with respect to low cost UEs that can only transmit in a small part of a system BW. In general, precluding orthogonal multiplexing can apply for any type of application.

A-SRS Transmission Triggering

Various embodiments of the present disclosure consider mechanisms to trigger an A-SRS transmission.

In a first approach, an A-SRS transmission from a UE in a cell without other UL transmissions from the UE is only configured by a DL DCI format, such as DL DCI Formats 1A/2B/2C/2D, scheduling a PDSCH transmission in the cell. An UL DCI format configures an A-SRS transmission only in a cell where an associated PUSCH is transmitted.

In a second approach, an eNB can configure a UE with a UE-common RNTI for scrambling a CRC of a UE-common DCI format triggering A-SRS transmissions (SRS-RNTI) for a group of UEs. This can enable an eNB to trigger A-SRS transmissions from a group of UEs without transmitting respective DL DCI formats to schedule associated PDSCH transmissions to the group of UEs and can enable the eNB to obtain CSI information prior to scheduling (or not scheduling) a PDSCH transmission to UEs in the group of UEs. A UE can be configured more than one locations in the UE-common DCI format corresponding to respective A-SRS triggering indications for one or more respective configured cells that can include either or both cells where the UE is configured for PUSCH transmissions and not configured for PUSCH transmissions. A UE can be configured more than one SRS-RNTI corresponding to SRS triggering in more than one respective groups of one or more cells.

An eNB configures to a UE a SRS-RNTI that scrambles a CRC of a DCI format. For example, the DCI format can have a same size as a DCI Format 0/1A, or DCI format 3/3A. This can avoid increasing a number of PDCCH decoding operation the UE needs to perform in a SF. The eNB also configures to the UE an index Index-SRS for the UE to determine a location for A-SRS triggering bits for the UE in the DCI format. The number of A-SRS triggering bits can be predetermined in the system operation or be configured to the UE. For example, the number of SRS triggering bit can be one for a UE with one transmitter antenna and two for a UE with more than one transmitter antennas. A UE can be configured a number of locations for A-SRS triggering bits for a respective number of cells where a location for each cell can either be determined, for example, according to an ascending order of a cell index or be individually configured for each cell. For example, for 16 UEs in the group of UEs, for a DCI format that includes 32 bits, and for 2 bits for triggering A-SRS transmission in a cell, the eNB can configure a UE the fifth bit and the sixth bit as the A-SRS triggering bits by setting the value of the Index-SRS index to indicate the third pair of bits. For example, for 4 UEs in the group of UEs, for a DCI format that includes 32 bits, and for 2 bits for triggering A-SRS transmission in a cell, the eNB can configure a UE the second eighth bits as the A-SRS triggering bits for four configured cells by setting the value of the Index-SRS index to indicate the second eight bits.

A number of TPC command bits for SRS transmission can also be included in the UE-common DCI format with CRC scrambled by SRS-RNTI. The number of TPC command bits can be same for each UE and can be defined in the system operation, such as for example two bits as in DCI format 3 or one bit as in DCI format 3A. Then, in a DL SF or a special SF, or at predetermined DL SFs or special SFs according to an A-SRS transmission periodicity, a UE can attempt to detect the UE-common DCI format and determine whether or not the UE shall transmit A-SRS in a respective cell, determine a respective parameter set in case of an A-SRS transmission in the cell, and determine a TPC command for adjusting a transmission power for an A-SRS or a P-SRS in the cell.

In a first example, the number of TPC command bits for an A-SRS transmission from a UE can be consecutive to the number of bits configuring the A-SRS transmission from the UE. In a second example, the TPC command bits can be located after the A-SRS transmission triggering bits for all UEs and each UE can derive the location of TPC command bits based on the location of the A-SRS triggering bits. For example, for 8 UEs in the group of UEs, for a UE-common DCI format that includes 32 bits, and for 2 bits for triggering A-SRS transmission in a cell and 2 bits for a TPC command, a UE that is configured the fifth bit and the sixth bit as the A-SRS triggering bits can determine that the TPC command bits are either the seventh of eight bits according to the first example or the twenty first and twenty second bits according to the second example. For example, for 4 UEs in the group of UEs, for a DCI format that includes 32 bits, and for 2 bits for triggering A-SRS transmission in a cell and 2 bits for a TPC command, the eNB can configure a UE the second eighth bits as the A-SRS triggering bits and the TPC command bits for two configured cells by setting the value of the Index-SRS index to indicate the second eight bits. The order of A-SRS triggering bits and TPC command bits can also be exchanged. A same approach can apply for a UE to determine a location in a DCI Format 3/3A with CRC scrambled by a TPC-SRS-RNTI of a TPC command for SRS transmission in a respective cell.

Figure 12:
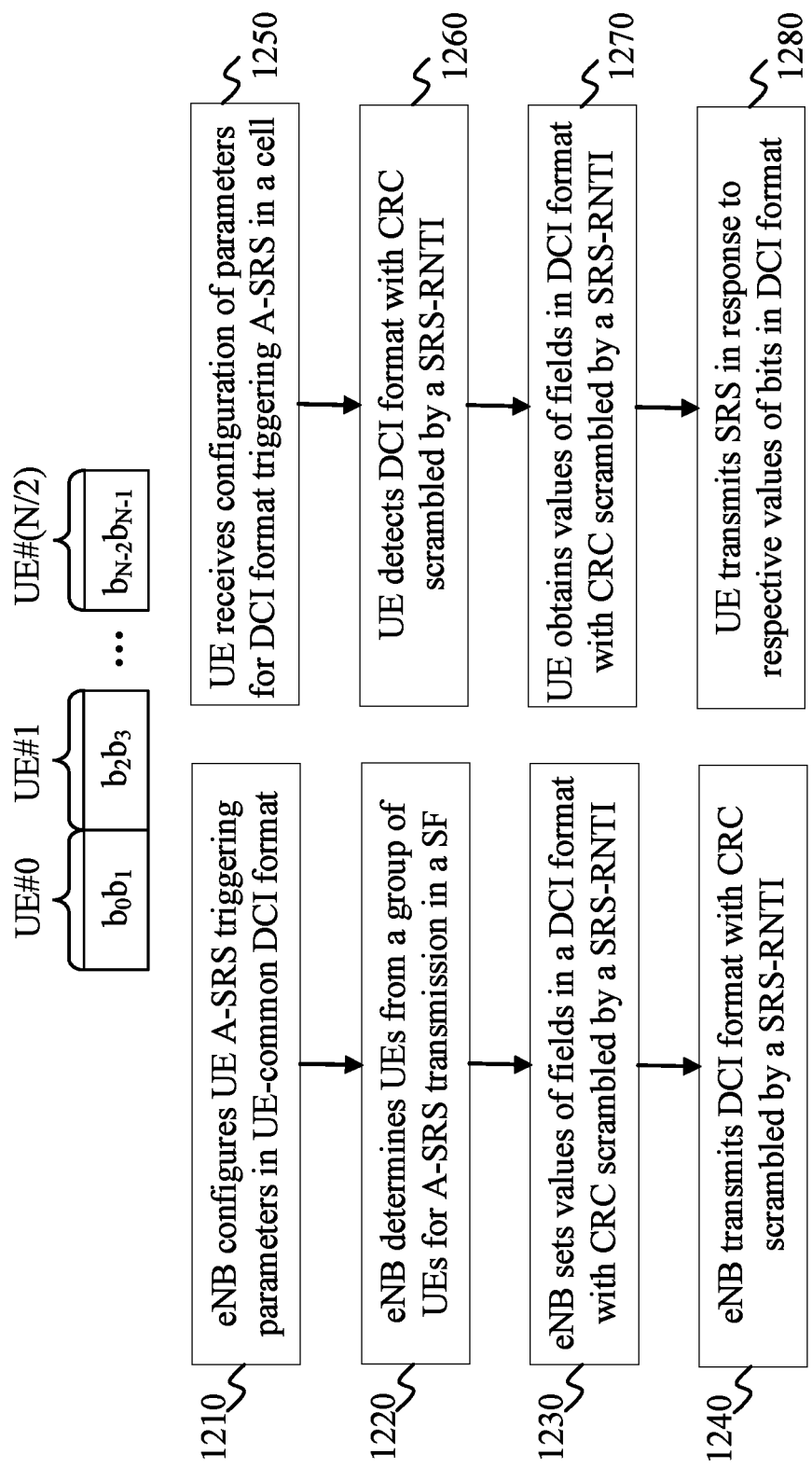
FIG. 12 illustrates contents of a downlink control information (DCI) format with cyclic redundancy check (CRC) scrambled by a SRS-cell radio network temporary identifier (RNTI) that indicates whether or not a UE transmits an Aperiodic SRS (A-SRS) in a cell according to some embodiments of the present disclosure.

FIG. 12 illustrates contents of a DCI format with CRC scrambled by a SRS-RNTI that indicates whether or not a UE transmits an A-SRS in a cell according to some embodiments of the present disclosure. The embodiment shown in FIG. 12 is for illustration only. Other embodiments could be used without departing from the scope of this disclosure.

An eNB configures to a UE a SRS-RNTI for a UE-common DCI format and a location in the UE-common DCI format for A-SRS triggering bits in a cell 1210. The eNB determines UEs from a group of UEs to trigger respective A-SRS transmission in a SF 1220. The eNB sets values of the bits according to whether or not the eNB triggers A-SRS transmission from a UE 1230. For example, for two bits associated with a cell, the eNB sets a value of '00' when the eNB does not trigger A-SRS transmission from the UE in the cell and the eNB sets a value other than '00' when the eNB triggers A-SRS transmission from the UE in the cell according to a configuration corresponding to the value of the two bits. The eNB transmits the DCI format with CRC scrambled by the SRS-RNTI 1240.

A UE receives from an eNB a configuration for a SRS-RNTI for a UE-common DCI format and for a location in the UE-common DCI format of bits associated with triggering an A-SRS transmission from the UE in a cell 1250. The UE detects the UE-common DCI format with CRC scrambled by the SRS-RNTI 1260. The UE obtains values of A-SRS triggering bits 1270. When the value of A-SRS triggering bits is '00', the UE does not transmit A-SRS in the cell and when the value of A-SRS triggering bits is not '00', the UE transmits A-SRS in a respective cell according to parameters that correspond to the value of the A-SRS triggering bits 980. The example in FIG. 12 assumes that a UE is configured a single cell for SRS transmission.

Figure 13:
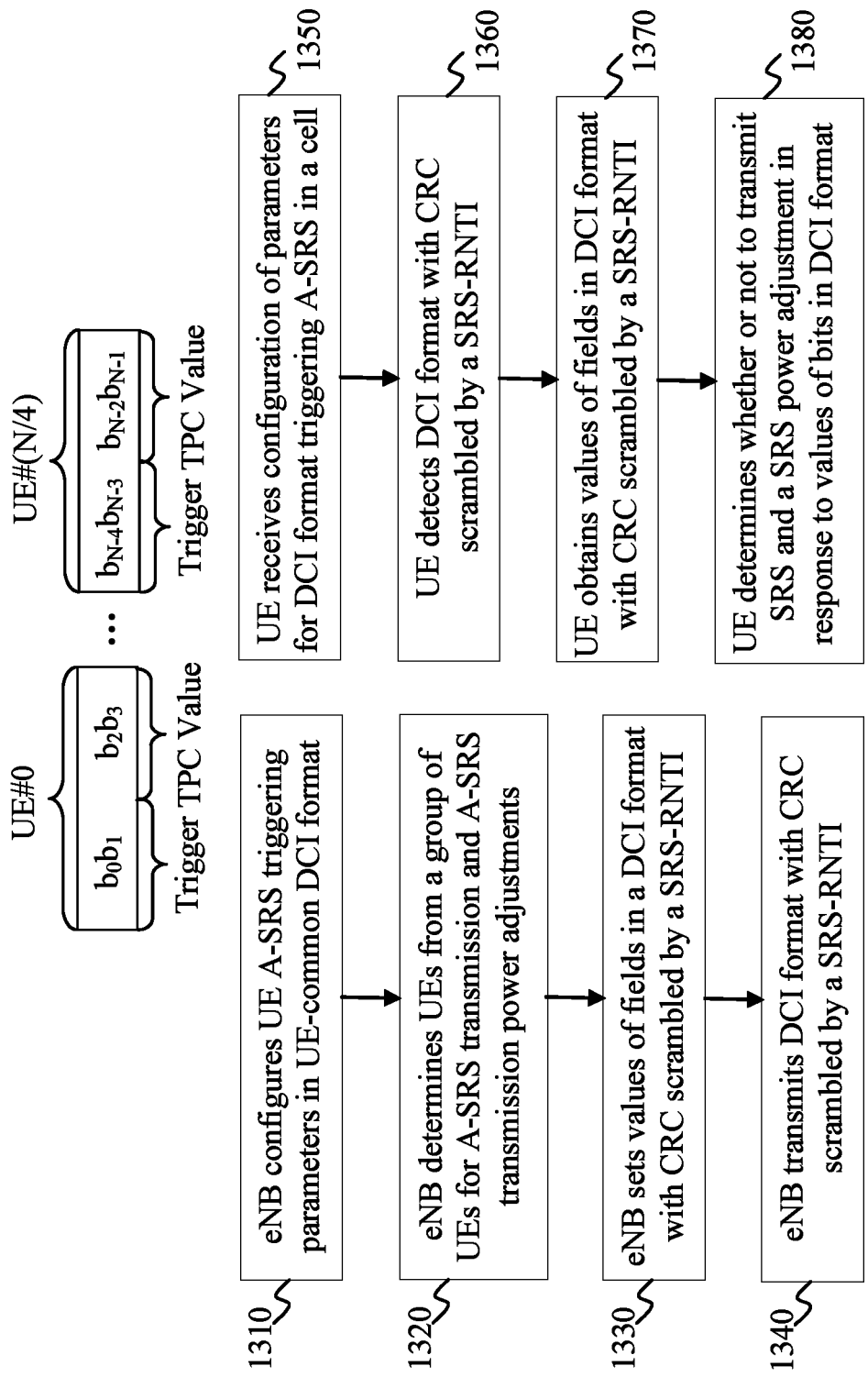
FIG. 13 illustrates contents of a DCI format with CRC scrambled by a SRS-RNTI that indicates whether or not a UE transmits an A-SRS in a cell and indicates a transmission power control (TPC) command for the UE to apply to a SRS transmission power according to some embodiments of the present disclosure.

FIG. 13 illustrates contents of a DCI format with CRC scrambled by a SRS-RNTI that indicates whether or not a UE transmits an A-SRS in a cell and indicates a TPC command for the UE to apply to a SRS transmission power according to some embodiments of the present disclosure. The embodiment shown in FIG. 13 is for illustration only. Other embodiments could be used without departing from the scope of this disclosure.

An eNB configures to a UE a SRS-RNTI for a UE-common DCI format, a location in the UE-common DCI format of bits associated with triggering an A-SRS transmission from the UE in a cell, and with TPC commands for the UE to determine an SRS transmission power adjustment 1310. The eNB determines UEs from a group of UEs to trigger respective A-SRS transmission and determines respective TPC commands for power adjustments 1320. The eNB sets values of the A-SRS triggering bits (e.g., a block of A-SRS triggering bits) according to whether or not the eNB triggers A-SRS transmission from a UE in a cell 1330. The eNB transmits the DCI format with CRC scrambled by SRS-RNTI 1340.

A UE receives from an eNB a configuration for a SRS-RNTI for a UE-common DCI format and for a location in the UE-common DCI format of bits associated with triggering an A-SRS transmission from the UE in a cell and with a TPC command for a respective power adjustment 1350. The UE detects the UE-common DCI format with CRC scrambled by the SRS-RNTI 1360. The UE obtains values of A-SRS triggering bits (e.g., a block of A-SRS triggering bits) and for TPC command bits (e.g., a block of TPC command bits) 1370. When the value of A-SRS triggering bits is '00', the UE does not transmit A-SRS in the cell and when the value of A-SRS triggering bits is not '00', the UE transmits A-SRS in the cell with a power adjustment determined from the TPC command and according to parameters that correspond to the values of bits 1380. The parameters are either configured for the values of bits from the eNB by higher layers or are determined in the system operation. A UE can process a TPC command even when the UE is not triggered A-SRS transmission. The example in FIG. 13 assumes that a UE is configured a single cell for SRS transmission.

Due to an absence of an UL DCI format to configure A-SRS transmission from a UE in a cell without other UL transmissions, only a single configuration for A-SRS transmission is possible since there is only a single bit in a DL DCI format to indicate whether or not a UE transmits A-SRS. For a UE with multiple transmitter antennas, this implies that there is no flexibility for dynamic determination of a set of UE antenna ports for A-SRS transmission and this set needs to be indicated by higher layers. For example, there is no flexibility for an eNB to dynamically configure whether 1 or 2 antenna ports are used by a UE to transmit A-SRS in case of two UE transmitter antenna ports or whether 1, 2, or 4 antenna ports are used by a UE to transmit A-SRS in case of four UE transmitter antenna ports. Moreover, there is no flexibility in dynamically configuring a BW for a A-SRS transmission. This is disadvantageous particularly in case of multiple UE transmitter antenna ports as it is possible for a UE to not be able to simultaneously transmit SRS from all antenna ports and as a power for SRS transmissions, that can often be less than a maximum available transmission power in case a UE also has other UL transmissions, needs to be equally divided among UE transmitter antenna ports and it can often be preferable for a A-SRS transmission BW to be smaller than a maximum one in order to achieve a sufficiently large power spectral density for A-SRS transmission.

The above limitations in dynamically configuring parameters for an A-SRS transmission can be mitigated by enabling a dynamic configuration for a parameter set for A-SRS transmission or by enabling configuration for A-SRS transmission in multiple SFs together with frequency hopping. A dynamic configuration for a parameter set is enabled by increasing a number of SRS triggering bits in the DL DCI formats from 1 to 2 or more bits when a UE is configured for A-SRS transmissions in cells without other UL transmissions or by using a new DCI format with a CRC scrambled by a SRS-RNTI that can associate more than one bit with A-SRS triggering in a respective cell. For example, in case of 2 bits, a mapping to configurations of parameters can be as in Table 2.

An eNB can configure a UE with A-SRS transmission in a number of multiple symbols of a SF or in multiple SFs, from same antenna ports or from different antenna ports, at least when each SRS transmission is over a BW that is smaller than a maximum transmission BW that an eNB indicates by a cell specific SRS BW configuration as in Table 1. For example, when an A-SRS transmission is configured to be over half a maximum transmission BW, the transmission occurs in two consecutive symbols of a SF, such as a special SF, or in consecutive SFs and frequency hops between the two halves of the maximum transmission BW. For example, when a UE has two antenna ports and cannot simultaneously transmit SRS from the two antenna ports, an SRS transmission can occur in two consecutive symbols of a SF, such as a special SF, or in consecutive SFs and be from a first antenna port in a first symbol and from a second antenna port in a second symbol. In general, when an eNB configures to a UE a SRS transmission BW of $m_{SRS,b}^c$ RBs in a cell and the eNB indicates a maximum SRS transmission BW of $m_{SRS,0}^c$ RBs in the cell, the UE transmits an A-SRS over $m_{SRS,0}^c/m_{SRS,b}^c$ SFs with frequency hopping per SRS transmission symbol in each of the $m_{SRS,0}^c/m_{SRS,b}^c$ SRS transmission BWs of $m_{SRS,b}^c$ RBs that constitute the $m_{SRS,0}^c$ RBs in the cell. Whether or not frequency hopping or transmission over multiple symbols or over multiple SFs is enabled can be configured to the UE by higher layers or can be associated with a parameter set when multiple parameter sets exist for an A-SRS transmission in case A-SRS triggering in a cell uses more than one bit.

It is also possible for a UE that is not configured with frequency hopping or with multi-symbol A-SRS transmissions to transmit an A-SRS over a maximum SRS transmission BW. In a first example, an A-SRS transmission BW can be associated with a SF where the DCI format triggering the A-SRS is transmitted. For example, for a same value of A-SRS triggering bits, a UE can transmit A-SRS in a first BW when the UE detects the DCI format triggering the A-SRS in a SF with an even index and the UE can transmit A-SRS in a second BW when the UE detects the DCI format triggering the A-SRS in a SF with an odd index. In a second example, in case of more than one A-SRS triggering bits, a first value of the A-SRS triggering bits can be associated with a first set of parameters that includes a first A-SRS transmission BW or a first set of antenna ports and a second value of the A-SRS triggering bits can be associated with a second set of parameters that includes a second A-SRS transmission BW or a second set of antenna ports.

Figure 14:
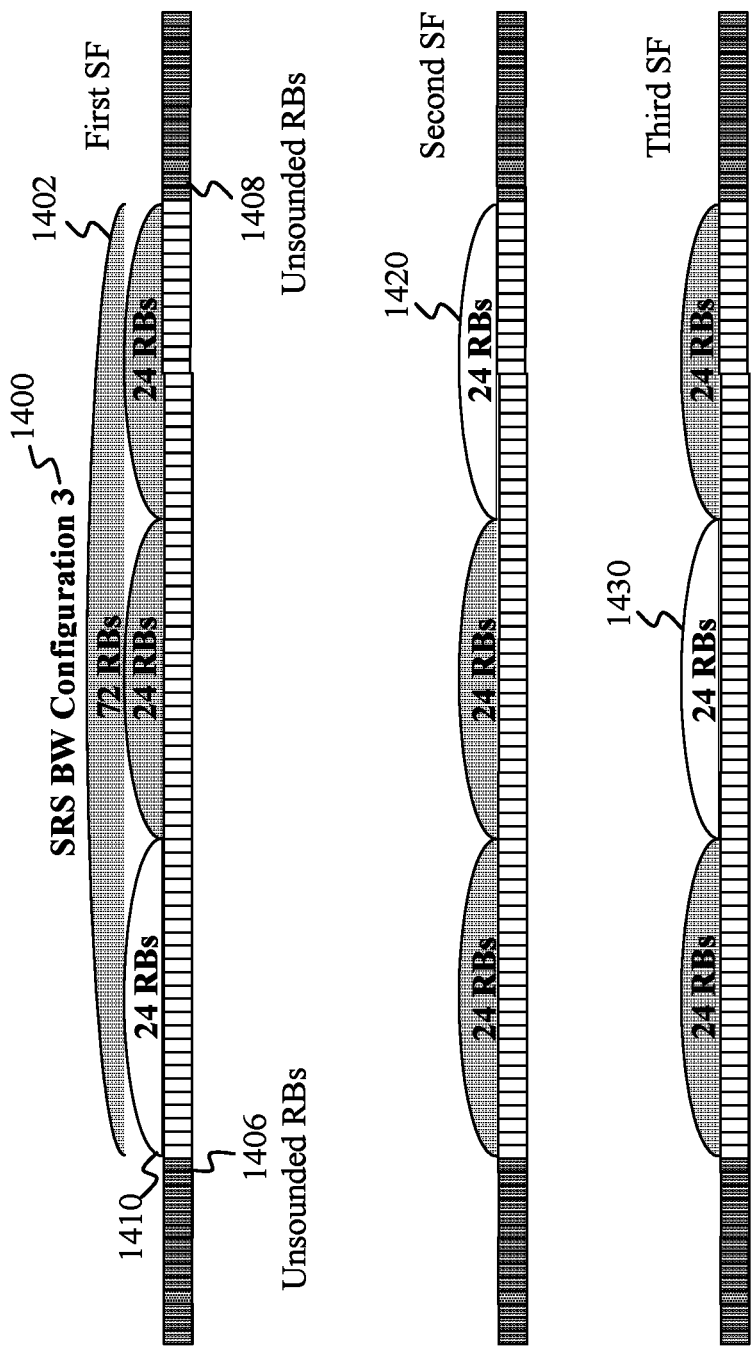
FIG. 14 illustrates an A-SRS transmission, triggered by one DCI format, in multiple SFs using frequency hopping according to some embodiments of the present disclosure.

FIG. 14 illustrates an A-SRS transmission, triggered by one DCI format, in multiple SFs using frequency hopping according to some embodiments of the present disclosure. The embodiment shown in FIG. 14 is for illustration only. Other embodiments could be used without departing from the scope of this disclosure.

An eNB signals by system information an SRS BW configuration 3 1400 having a maximum SRS BW of 72 RBs 1402. A SRS transmission does not exist in a number of RBs in a system BW 1406, 1408. A UE is configured by higher layers to transmit A-SRS over a first BW of 24 RBs 1410 in a first SF. A BW location for an A-SRS transmission in the first SF can be configured to the UE by higher layers or can be predetermined, such as for example to be the one that includes the 24 RBs with the lower indexes. The eNB configures the UE, either by independent configuration or through an indication of a parameter set for an A-SRS transmission, to transmit A-SRS with frequency hopping over three SFs so that the maximum BW of 72 RBs is sounded by the UE. The UE transmits A-SRS in the 24 RBs with largest indexes in a second SF 1420 and transmits A-SRS in the middle 24 RBs from the 72 RBs in a third SF 1430.

When a cell where a UE is configured to transmit SRS and the UE is not configured for any other UL transmission requires a different TAG than any of the cells where the UE is also configured for other UL transmissions, the UE shall also be able to transmit a random access (RA) preamble in a physical random access channel (PRACH) in the cell in response to a PDCCH order from an eNB in order for the eNB to issue to the UE an appropriate timing advance (TA) value through a random access response (RAR) for SRS transmissions in the cell. Therefore, it is possible that a UE configured to transmit only SRS in a cell need to also support PRACH transmissions in the cell. In such case, the UE can prioritize the PRACH transmission in the cell over other transmissions, except for PRACH transmissions, in other cells when the UE needs to suspend a transmission according to a UE capability for a total number of transmissions in different cells in a same SF. A need for PRACH transmission in a cell where a UE is otherwise configured only for SRS transmissions, that is the UE is not configured for PUSCH/PUCCH transmission, can be avoided by restricting the cell to belong in a same TAG as a cell where the UE is configured for PUSCH/PUCCH transmission.

A UE can determine an initial power for a carrier-switched SRS transmission after the UE transmits a PRACH on a cell c as follows.

For a first SF i=0 of a SRS transmission on cell c, $f_c(0) = \Delta P_{rampup,c} + \delta_{SRS,c}$, where $\delta_{SRS,c}$ is a TPC command in a DCI format 3/3A (with CRC scramble with a SRS-RNTI), $\Delta P_{rampup,c} = \min[\{\max(0, P_{CMAX,c} - (10 \log_{10}(M_{SRS,c}) + P_{O\_SRS,c}(m) + \alpha_{SRS,c} \cdot PL_c))\}, \Delta P_{rampuprequested,c}]$, $M_{SRS,c}$ is the bandwidth of the first SRS transmission, and $\Delta P_{rampuprequested,c}$ is provided by higher layers and corresponds to a total power ramp-up requested by higher layers from a first to a last RA preamble on cell c. For a carrier-switched SRS transmission associated without an associated DCI format with CRC scrambled with SRS-RNTI, $\delta_{SRS,c}=0$.

The present disclosure enables SRS transmissions from a UE in cells where the UE in not configured for other UL transmissions. The present disclosure provides a power control mechanism for SRS transmissions in cells where the UE is not configured for UL transmissions. The present disclosure also provides a definition for a PH report for a cell where a UE transmits SRS and the UE is not configured for other UL transmissions in the cell. The present disclosure additionally provides prioritization rules for power allocation to SRS transmission when a UE is configured to simultaneously transmit SRS in cells where the UE is configured for other UL transmissions and in cells where the UE is not configured for uplink (UL) transmissions. The present disclosure further provides mechanisms for timing of an A-SRS transmission from a UE in a cell where the UE is not configured for other UL transmissions in order to avoid simultaneous transmission of the A-SRS in the cell and physical UL shared channel (PUSCH)/physical UL control channel (PUCCH) transmissions in other cells. The present disclosure provides mechanisms for triggering A-SRS transmissions in cells where a UE is not configured for other UL transmissions.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A user equipment (UE) comprising:
 a receiver configured to receive a first downlink control information (DCI) format and a second DCI format, wherein:
  the first DCI format includes a first block of bits that provides only one of:
   a transmit power control (TPC) command value for adjusting only a sounding reference signal (SRS) transmission power on a first cell, or
   an SRS request value for either triggering or not triggering a SRS transmission on the first cell and the TPC command value for adjusting only the SRS transmission power on the first cell, and
  the second DCI format includes a second block of bits that provides a TPC command value for adjusting both a SRS transmission power and a physical uplink shared channel (PUSCH) transmission power on a second cell; and
 a transmitter configured to:
  in response to the received first DCI format including the SRS request value triggering the SRS transmission on the first cell, transmit a SRS on the first cell,
 wherein the UE is configured not to transmit any PUSCH on the first cell, and
 wherein the UE is configured not to process any DCI format scheduling a PUSCH transmission on the first cell.

2. The UE of claim 1, wherein the receiver is further configured to receive a configuration indicating whether the first block of bits provides only the TPC command value or both the SRS request value and the TPC command value.

3. The UE of claim 1, wherein the receiver is further configured to receive a configuration indicating that the first block of bits is applicable for the SRS transmission on the first cell and the second block of bits is applicable for SRS transmission on the second cell.

4. The UE of claim 1, wherein the transmitter is further configured to transmit the SRS from a subset of antenna ports of a set of antenna ports, wherein the subset of antenna ports is indicated by the SRS request value.

5. The UE of claim 1, wherein:
 a size of the first DCI format is equal to a size of the second DCI format that includes only second TPC commands, and
 the TPC command from the second TPC commands adjusts the PUSCH transmission power on the second cell.

6. The UE of claim 1, wherein a SRS transmission power $P_{SRS,c}(i)$ in decibels per milliwatt (dBm) in time instance i and on cell c is:

$$P_{SRS,c}(i)=\min\{P_{CMAX,c}(i), 10\log_{10}(M_{SRS,c})+P_{O\_SRS,c}(m)+\alpha_{SRS,c} \cdot PL_c+f_c(i)\} \text{ dBm,}$$

$\min\{x, y\}$ is a minimum function resulting the smaller of numbers x, y,
 $\log_{10}(x)$ is a logarithm function with base 10 resulting a logarithm with base 10 for number x,
 $P_{CMAX,c}(i)$ is a transmission power in time instance i configured by higher layers for cell c,
 $M_{SRS,c}$ is a SRS transmission bandwidth in time instance i and on cell c,
 $P_{O\_SRS,c}(m)$ is configured by higher layers for cell c, m=0 when the SRS transmission is configured by higher layers, and m=1 when the SRS transmission is configured by the DCI format,
 $PL_c$ is a path loss value measured on cell c,
 $\alpha_{SRS,c}$ is configured by higher layers for SRS transmission on cell c, and
 $f_c(i)$ is a transmission power control adjustment state, determined from TPC commands in the DCI format, for SRS transmission in time instance i and on cell c.

7. The UE of claim 6, wherein:

$$f_c(O)=\Delta P_{rampup,c}+\delta_{SRS,c},$$

$$\Delta P_{rampup,c}=\min[\{\max(0,P_{CMAX,c}-(10\log_{10}(M_{SRS,c})+P_{O\_SRS,c}(m)+\alpha_{SRS,c} \cdot PL_c))\}\Delta P_{rampupreqsted,c}]$$

$\max\{x, y\}$ is a maximum function resulting the larger of numbers x, y,
 $M_{SRS,c}$ is a SRS bandwidth at a time instance of a first SRS transmission on cell c,
 $\Delta P_{rampuprequested,c}$ is a total power ramp-up power from a first to a last random access preamble transmission on cell c and is configured by higher layers, and
 $\delta_{SRS,c}$ is a value of the TPC command in the DCI format.

8. The UE of claim 6, wherein a power headroom (PH) report for SRS transmission in time instance i and on cell c is determined as $PH_c(i)=P_{CMAX,c}(i)-\{10 \log_{10}(M_{SRS,c}(i))+P_{O\_SRS,c}(m)+\alpha_{SRS,c}\cdot PL_c+f_c(i)\}$.

9. A base station comprising:
a transmitter configured to transmit, to a user equipment (UE), a first downlink control information (DCI) format and a second DCI format, wherein:
  the first DCI format includes a first block of bits that provides only one of:
    a transmit power control (TPC) command value for adjusting only a sounding reference signal (SRS) transmission power on a first cell, or
    an SRS request value for either triggering or not triggering a SRS transmission on the first cell and the TPC command value for adjusting only the SRS transmission power on the first cell, and
  the second DCI format includes a second block of bits that provides a TPC command value for adjusting both a SRS transmission power and a physical uplink shared channel (PUSCH) transmission power on a second cell; and
a receiver configured to, in response to the transmitted first DCI format including the SRS request value triggering the SRS transmission on the first cell, receive, from the UE, a SRS on the first cell,
wherein the UE is configured not to transmit any PUSCH on the first cell, and
wherein the UE is configured not to process any DCI format scheduling a PUSCH transmission on the first cell.

10. The base station of claim 9, wherein the transmitter is further configured to transmit a configuration indicating whether the first block of bits provides only the TPC command value or both the SRS request value and the TPC command value.

11. The base station of claim 9, wherein the transmitter is further configured to transmit a configuration indicating that the first block of bits is applicable for the SRS transmission on the first cell and the second block of bits is applicable for SRS transmission on the second cell.

12. The base station of claim 9, wherein:
a size of the first DCI format is equal to a size of the second DCI format that includes only second TPC commands, and
the TPC command from the second TPC commands adjusts the PUSCH transmission power on the second cell.

13. A method for operating a user equipment (UE), the method comprising:
receiving a first downlink control information (DCI) format and a second DCI format, wherein:
  the first DCI format includes a first block of bits that provides only one of:
    a transmit power control (TPC) command value for adjusting only a sounding reference signal (SRS) transmission power on a first cell, or
    a SRS request value for either triggering or not triggering a SRS transmission on the first cell and the TPC command value for adjusting only the SRS transmission power on the first cell, and
  the second DCI format includes a second block of bits that provides a TPC command value for adjusting both a SRS transmission power and a physical uplink shared channel (PUSCH) transmission power on a second cell; and
in response to the received first DCI format including the SRS request value triggering the SRS transmission on the first cell, transmitting a SRS on the first cell,
wherein the UE is configured not to transmit any PUSCH on the first cell, and
wherein the UE is configured not to process any DCI format scheduling a PUSCH transmission on the first cell.

14. The method of claim 13, further comprising:
receiving a configuration indicating whether the first block of bits provides only the TPC command value or both the SRS request value and the TPC command value.

15. The method of claim 13, further comprising:
receiving a configuration indicating that the first block of bits is applicable for the SRS transmission on the first cell and the second block of bits is applicable for SRS transmission on the second cell.

16. The method of claim 13, wherein:
a size of the first DCI format is equal to a size of the second DCI format that includes only second TPC commands,
the TPC command from the second TPC commands adjusts the PUSCH transmission power on the second cell,
the first DCI format includes cyclic redundancy check (CRC) bits that are scrambled by a first radio network temporary identifier (RNTI), and
the second DCI format includes CRC bits that are scrambled by a second RNTI.

17. The method of claim 13, further comprising:
transmitting the SRS from a subset of antenna ports of a set of antenna ports, wherein the subset of antenna ports is indicated by the SRS request value.

18. The method of claim 13, wherein a SRS transmission power $P_{SRS,c}(i)$ in decibels per milliwatt (dBm) in time instance i and on cell c is:

$P_{SRS,c}(i)=\min\{P_{CMAX,c}(i),10 \log_{10}(M_{SRS,c})+P_{O\_SRS,c}(m)+\alpha_{SRS,c}\cdot PL_c+f_c(i)\}$ dBm, min{x, y} is a minimum function resulting the smaller of numbers x, y,
$\log_{10}(x)$ is a logarithm function with base 10 resulting a logarithm with base 10 for number x,
$P_{CMAX,c}(i)$ is a transmission power in time instance i configured by higher layers for cell c,
$M_{SRS,c}$ is a SRS transmission bandwidth in time instance i and on cell c,
$P_{O\_SRS,c}(m)$ is configured by higher layers for cell c, m=0 when the SRS transmission is configured by higher layers, and m=1 when the SRS transmission is triggered by the DCI format,
$PL_c$ is a path loss value measured on cell c,
$\alpha_{SRS,c}$ is configured by higher layers for SRS transmission on cell c, and
$f_c(i)$ is a transmission power control adjustment state, determined from TPC command values, for SRS transmission in time instance i and on cell c.

19. The method of claim 18, wherein:

$f_c(O)=\Delta P_{rampup,c}+\delta_{SRS,c}$, $\Delta P_{rampup,c}=\min[\{\max(0,P_{CMAX,c}-(10 \log_{10}(M_{SRS,c})+P_{O\_SRS,c}(m)+\alpha_{SRS,c}\cdot PL_c))\}\Delta P_{rampuprequested,c}]$ max{x, y} is a maximum function resulting the larger of numbers x, y,
$M_{SRS,c}$ is a SRS bandwidth at a time instance of a first SRS transmission on cell c,
$\Delta P_{rampuprequested,c}$ is a total power ramp-up power from a first to a last random access preamble transmission on cell c and is configured by higher layers, and $\delta_{SRS,c}$ is a value of the TPC command value in the DCI format.

20. The method of claim 18, wherein a power headroom (PH) report for SRS transmission in time instance i and on cell c is determined as $PH_c(i)=P_{CMAX,c}(i)-\{10 \log_{10} (M_{SRS,c}(i))+P_{O\_SRS,c}(m)+\alpha_{SRS,c} \cdot PL_c+f_c(i)\}$.

* * * * *